(12) United States Patent
Hafenrichter et al.

(10) Patent No.: US 11,787,565 B2
(45) Date of Patent: Oct. 17, 2023

(54) SYSTEMS AND METHODS FOR JOINING A FIRST STRUCTURE AND A SECOND STRUCTURE WITH A CHOREOGRAPHED ADHESIVE DE-AERATION PROCESS

(71) Applicant: The Boeing Company, Chicago, IL (US)

(72) Inventors: Joseph L. Hafenrichter, Chicago, IL (US); Gary E. Georgeson, Chicago, IL (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/502,270

(22) Filed: Oct. 15, 2021

(65) Prior Publication Data
US 2022/0194628 A1    Jun. 23, 2022

Related U.S. Application Data

(60) Provisional application No. 63/126,626, filed on Dec. 17, 2020.

(51) Int. Cl.
| | |
|---|---|
| B64F 5/10 | (2017.01) |
| B29C 65/54 | (2006.01) |
| B29C 65/48 | (2006.01) |
| B29L 31/30 | (2006.01) |

(52) U.S. Cl.
CPC ............ B64F 5/10 (2017.01); B29C 65/4835 (2013.01); B29C 65/544 (2013.01); *B29L 2031/3085* (2013.01)

(58) Field of Classification Search
CPC ...... B29L 2031/3082; B29L 2031/3085; B64F 5/10
See application file for complete search history.

(56) References Cited

U.S. PATENT DOCUMENTS

| | | | |
|---|---|---|---|
| 10,000,019 B2 * | 6/2018 | Evens | ..................... B29C 73/12 |
| 2012/0125534 A1 * | 5/2012 | Watson | ............... B29C 66/1122 |
| | | | 156/583.1 |

* cited by examiner

*Primary Examiner* — Galen H Hauth
*Assistant Examiner* — Alexander S Wright
(74) *Attorney, Agent, or Firm* — McDonnell Boehnen Hulbert & Berghoff LLP

(57) ABSTRACT

An example method of joining a first structure and a second structure is described that includes placing an adhesive within a bond cavity for bonding a first structure to a second structure, securing a vacuum bag to the first structure and the second structure so as to surround a portion of the first structure and the second structure, evacuating the bond cavity via a vacuum port to deaerate the adhesive within the bond cavity, after deaerating the adhesive, moving the first structure and the second structure relative to one another such that deaerated adhesive is disposed between the first structure and the second structure, and curing, via one or more heaters, the deaerated adhesive disposed between the first structure and the second structure to bond the first structure to the second structure.

20 Claims, 19 Drawing Sheets

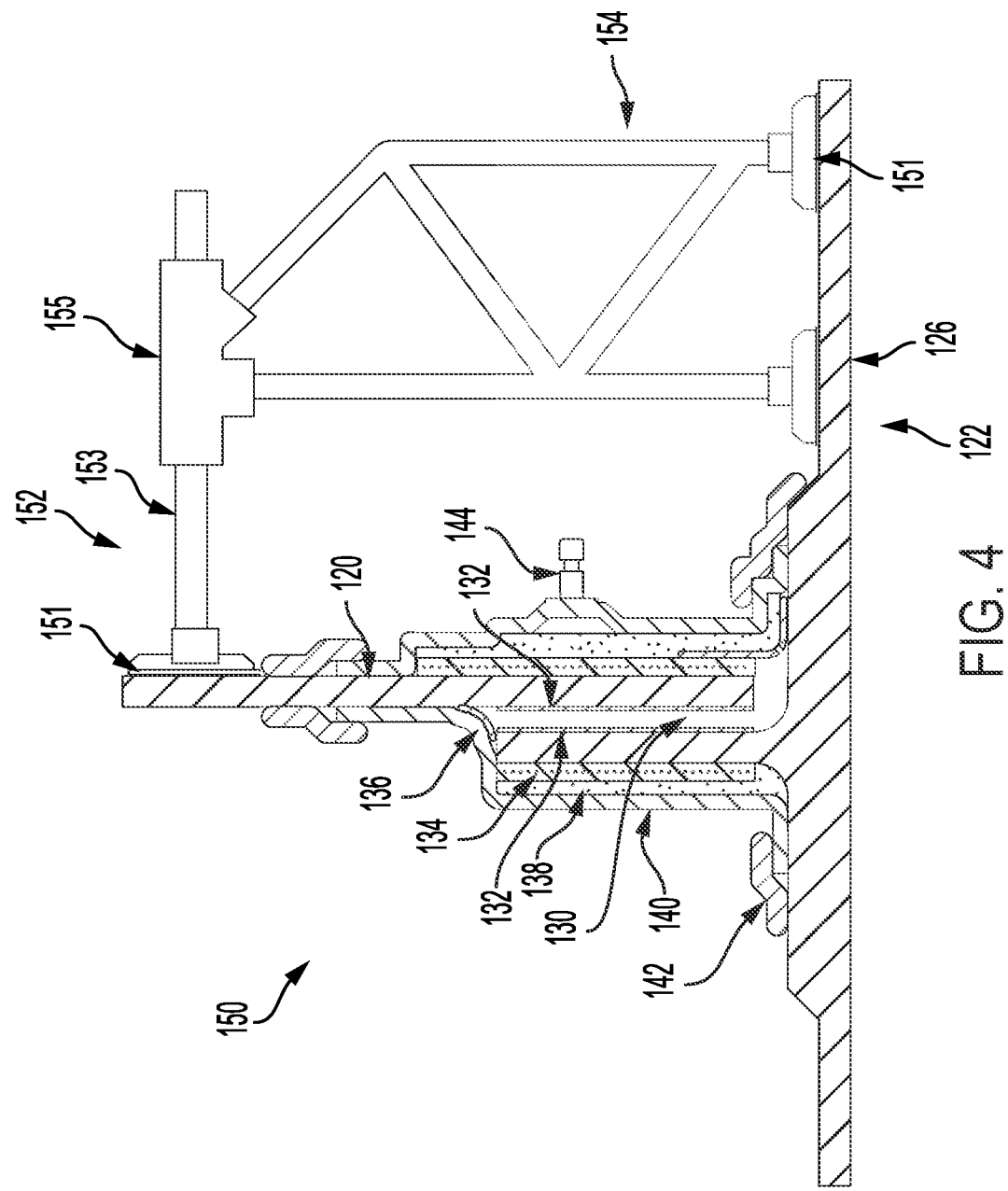

FORMING THE BOND CAVITY BETWEEN A FIRST STRUCTURE AND A SECOND STRUCTURE VIA POSITIONING OF THE FIRST STRUCTURE RELATIVE TO THE SECOND STRUCTURE — 218

FIG. 12

MOVING THE FIRST STRUCTURE AND THE SECOND STRUCTURE RELATIVE TO ONE ANOTHER CAUSES THE DEAERATED ADHESIVE TO BE DISPOSED IN THE BOND CAVITY BETWEEN THE FIRST STRUCTURE AND THE SECOND STRUCTURE — 220

FIG. 13

INSERTING A SPACER INTO A BOTTOM AREA OF THE BOND CAVITY TO CONTROL BONDLINE THICKNESS — 222

FIG. 14

INSERTING A COLLAPSIBLE STANDOFF INTO A BOTTOM AREA OF THE BOND CAVITY TO CONTROL A DISTANCE OF DISTRIBUTION OF THE ADHESIVE INTO THE BOND CAVITY BASED ON TEMPERATURE — 224

FIG. 15

PLACING A SEMI-PERMEABLE BREATHER MATERIAL AT THE ONE OR MORE EXITS OF THE BOND CAVITY — 226

FIG. 16

CONTINUOUSLY EVACUATING THE BOND CAVITY VIA THE VACUUM PORT WHILE MOVING THE FIRST STRUCTURE AND THE SECOND STRUCTURE RELATIVE TO ONE ANOTHER — 228

FIG. 17

CONTROLLING A POSITION OF THE FIRST STRUCTURE RELATIVE TO THE SECOND STRUCTURE VIA A COLLAPSIBLE STANDOFF — 230

FIG. 18

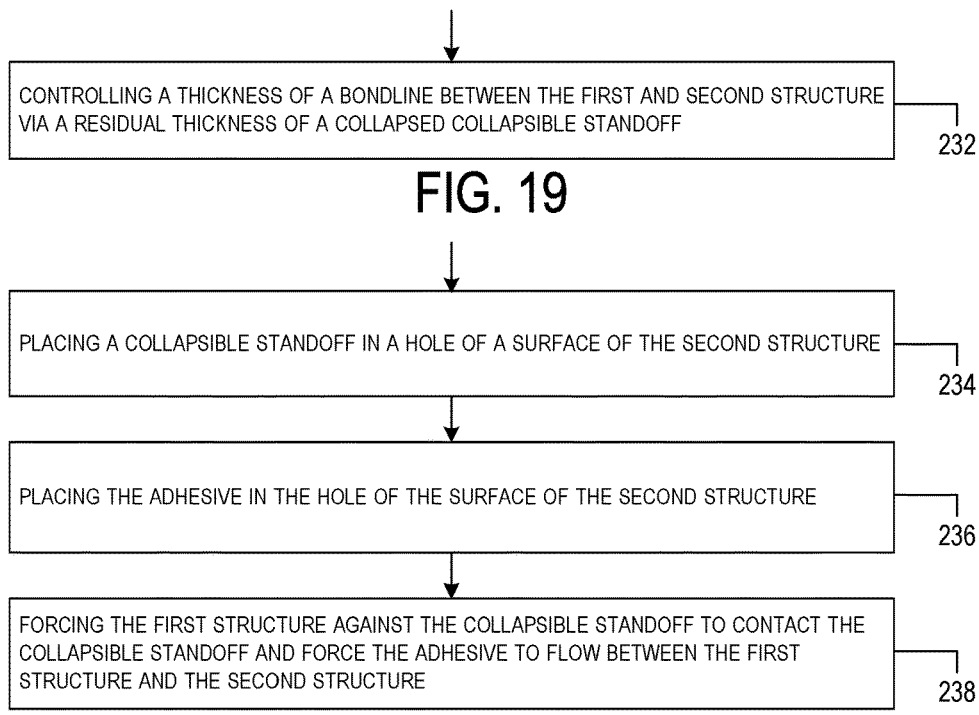
FIG. 19
FIG. 20
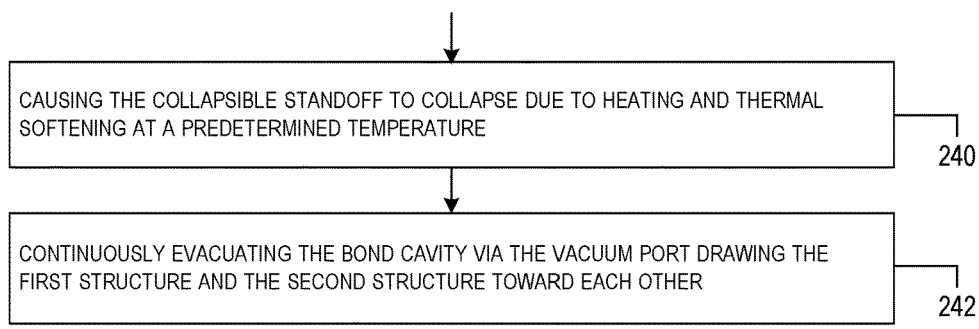
FIG. 21
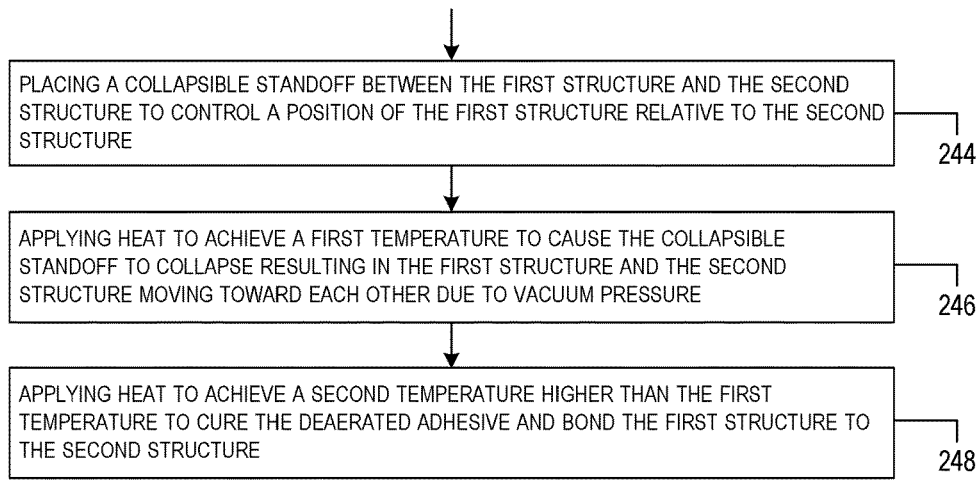
FIG. 22

SYSTEMS AND METHODS FOR JOINING A FIRST STRUCTURE AND A SECOND STRUCTURE WITH A CHOREOGRAPHED ADHESIVE DE-AERATION PROCESS

CROSS REFERENCE TO RELATED APPLICATION

The present disclosure claims priority to U.S. Provisional Application No. 63/126,626, filed on Dec. 17, 2020, the entire contents of which are herein incorporated by reference.

FIELD

The present disclosure relates generally to forming a bonded structure. In particular, the present disclosure relates to reducing voids in bondlines between a first structure and a second structure and forming a voidfree bondline.

BACKGROUND

Components used in vehicles, such as wings used in aircraft, include several bonded members. For example, exterior surfaces of a wing, and the structures used to provide support for those surfaces, may be constructed in a bonded manner using adhesives to create bondlines.

Currently, bonds for large or complex structures involve resin transfer molding, high tolerance film adhesive, or costly co-cure methods. Further, currently, paste bonds such as those that may be used in pi joints and single shear joints in aircraft, utilize adhesive injection approaches that can create bondlines between the bonded members that have some voids and variation in strength, and accordingly, may be rated with a lower performance capability.

As such, there is a desire for an improved bonding method to produce higher quality bonds in a low cost manner.

SUMMARY

In an example, a method of joining a first structure and a second structure is described. The method comprises placing an adhesive within a bond cavity for bonding a first structure to a second structure, securing a vacuum bag to the first structure and the second structure so as to surround a portion of the first structure and the second structure, evacuating the bond cavity via a vacuum port to deaerate the adhesive within the bond cavity, after deaerating the adhesive, moving the first structure and the second structure relative to one another such that deaerated adhesive is disposed between the first structure and the second structure, and curing, via one or more heaters, the deaerated adhesive disposed between the first structure and the second structure to bond the first structure to the second structure.

In another example, a bondline joining a first structure and a second structure is described made by a process comprising placing an adhesive within a bond cavity for bonding a first structure to a second structure, securing a vacuum bag to the first structure and the second structure so as to surround a portion of the first structure and the second structure, evacuating the bond cavity via a vacuum port to deaerate the adhesive within the evacuated bond cavity, after deaerating the adhesive, moving the first structure and the second structure relative to one another such that deaerated adhesive is disposed between the first structure and the second structure, and curing, via one or more heaters, the deaerated adhesive disposed between the first structure and the second structure to bond the first structure to the second structure and to form the bondline joining the first structure and the second structure.

In another example, a system for joining a first structure and a second structure is described. The system comprises one or more fixtures forming a bond cavity between a first structure and a second structure via positioning of the first structure relative to the second structure and to cause movement of the first structure and the second structure relative to one another, a vacuum bag to secure the first structure and the second structure by surrounding a portion of the first structure and the second structure, a vacuum port coupled to the vacuum bag for evacuating the bond cavity to deaerate an adhesive within the bond cavity such that deaerated adhesive is disposed between the first structure and the second structure, and one or more heaters for curing the deaerated adhesive disposed between the first structure and the second structure to bond the first structure to the second structure.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 4 illustrates an example of a system for joining the first structure and the second structure, according to an example implementation.

FIG. 12 illustrates a flowchart of additional functions for use with the method shown in FIG. 8, according to an example implementation.

FIG. 13 illustrates a flowchart of additional functions for use with the method shown in FIG. 8, according to an example implementation.

FIG. 14 illustrates a flowchart of additional functions for use with the method shown in FIG. 8, according to an example implementation.

FIG. 15 illustrates a flowchart of additional functions for use with the method shown in FIG. 8, according to an example implementation.

FIG. 16 illustrates a flowchart of additional functions for use with the method shown in FIG. 8, according to an example implementation.

FIG. 17 illustrates a flowchart of additional functions for use with the method shown in FIG. 8, according to an example implementation.

FIG. 18 illustrates a flowchart of additional functions for use with the method shown in FIG. 8, according to an example implementation.

FIG. 19 illustrates a flowchart of additional functions for use with the method shown in FIG. 8, according to an example implementation.

FIG. 20 illustrates a flowchart of additional functions for use with the method shown in FIG. 8, according to an example implementation.

FIG. 21 illustrates a flowchart of additional functions for use with the method shown in FIG. 8, according to an example implementation.

FIG. 22 illustrates a flowchart of additional functions for use with the method shown in FIG. 8, according to an example implementation.

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Example systems and methods involve joining a first structure and a second structure to create a void-free bondline between the first structure and the second structure. An example method includes placing an adhesive within a bond cavity for bonding a first structure to a second structure, securing a vacuum bag to the first structure and the second structure so as to surround a portion of the first structure and the second structure, evacuating the bond cavity via a vacuum port to deaerate the adhesive within the bond cavity, after deaerating the adhesive, moving the first structure and the second structure relative to one another such that deaerated adhesive is disposed between the first structure and the second structure, and curing, via one or more heaters, the deaerated adhesive disposed between the first structure and the second structure to bond the first structure to the second structure.

The example systems and methods can in some instances enable creating high quality, void-free bondlines in bond configurations that are traditionally high in void content, have high variation in strength, and would otherwise take strength "knockdowns" in performance predictions.

In some examples described herein, collapsible stand-offs are used to maintain gap fill widths for adhesive insertion between the first structure and the second structure. The collapsible standoffs then collapse at designated temperature and/or pressure combinations to force out entrapped air that may otherwise create a void. Thus, the collapsible stand-offs may control bondline thickness during a curing process and reduce gas entrapment to improve bondline quality.

Figures 1A, 1B:
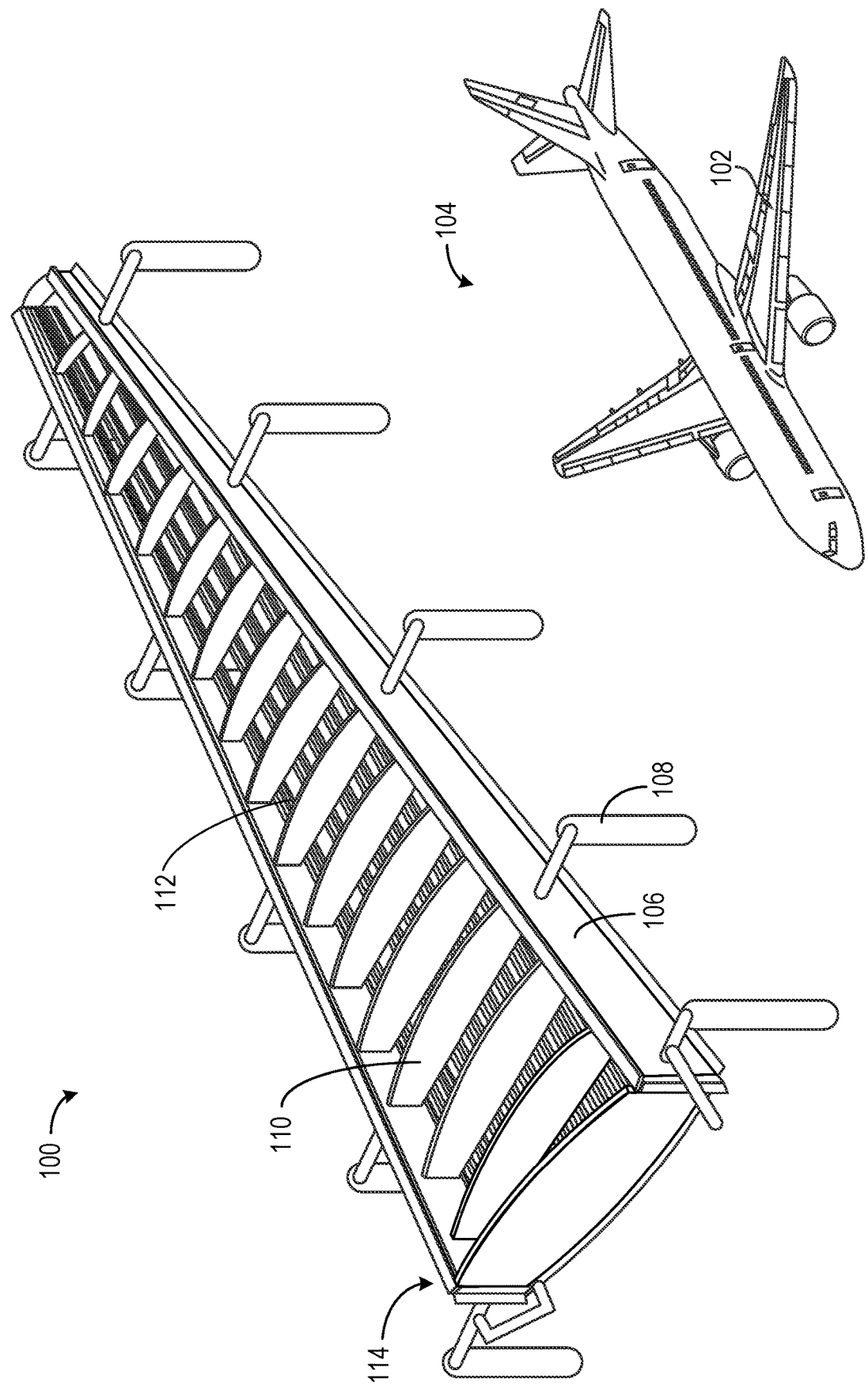
FIG. 1A illustrates a system for forming a bonded wing of an aircraft, according to an example implementation.
FIG. 1B illustrates an example of the aircraft including the bonded wing, according to an example implementation.

FIG. 1A illustrates a system 100 for forming a bonded wing 102 of an aircraft 104, according to an example implementation. FIG. 1B illustrates an example of the aircraft 104 including the bonded wing 102.

The system 100 includes a plurality of spars 106, which are held in place by a plurality of fixture arms 108. The plurality of fixture arms 108 are not included in the assembled wing, but are rather provided for purposes of assembly. Other fixtures or tools can be used for holding aspects of the system 100 in place during assembly. The system 100 further includes a plurality of wing ribs 110, which are attached between the spars 106. The system 100 further includes a plurality of longerons 112, which run parallel to the spars 106, and which provide an interface between the wing ribs 110 and other aspects of the system 100. The longerons 112 may provide a strength to the system 100.

The spars 106 can collectively form a portion of a wing box 114 that provides lateral structure to the system 100, and which provides a general shape and dimension of the system 100. Further, additional components of the system 100 may couple to the wing box 114. Accordingly, the dimensions of the spars 106 may strictly adhere to design plans for the wing 102.

Figure 2:
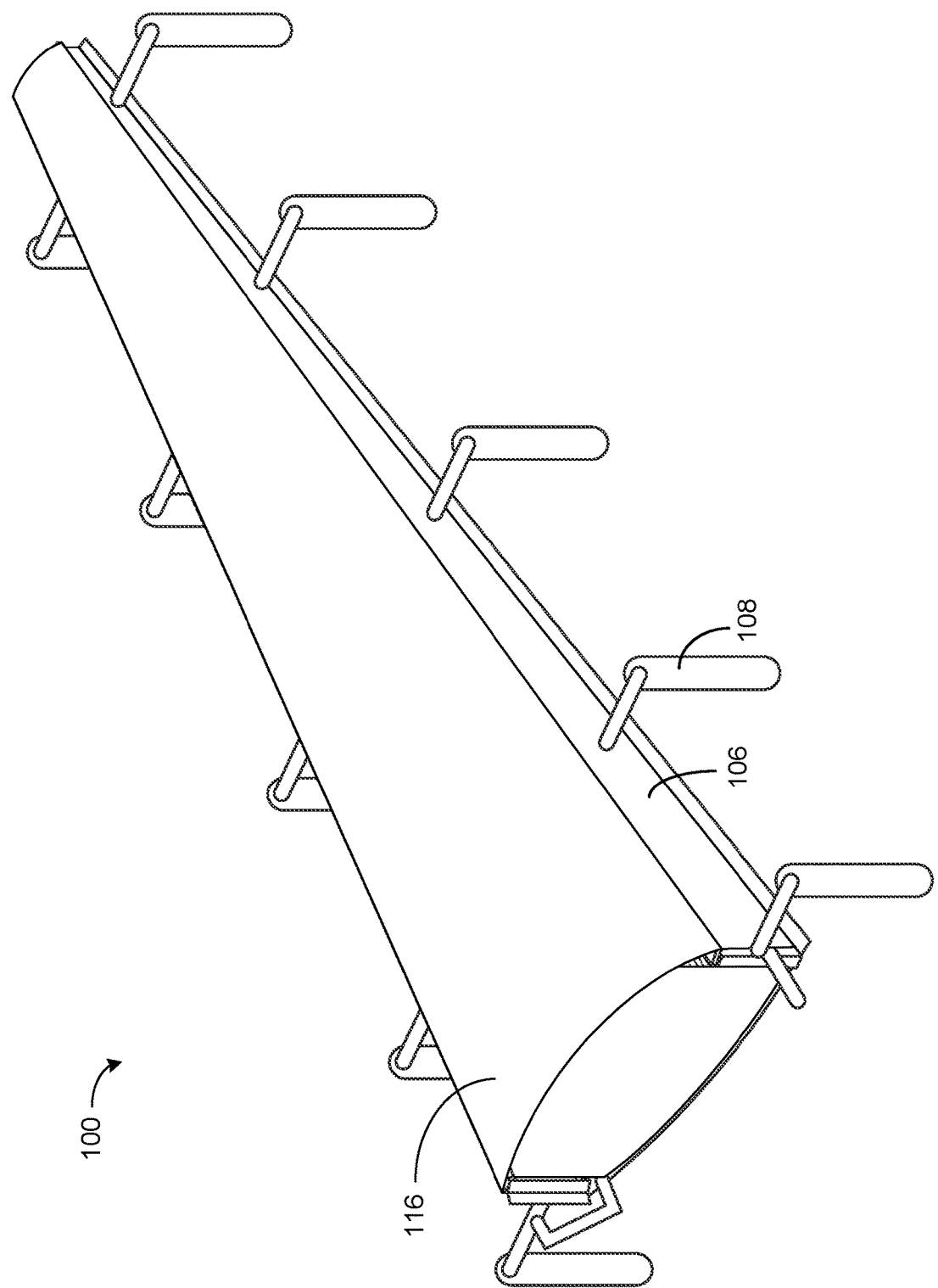
FIG. 2 illustrates the system with a portion of a wing skin coupled or bonded to the spars, the wing ribs, and the longerons, according to an example implementation.

FIG. 2 illustrates the system 100 with a portion of a wing skin 116 coupled or bonded to the spars 106, the wing ribs 110, and the longerons 112, according to an example implementation. By coupling the wing skin 116 to a component of the wing (e.g., the spars 106, the wing ribs 110, and the longerons 112), the bonded wing 102 is formed.

FIGS. 3A-3F, FIGS. 5A-5E, FIGS. 6A-6G, and FIGS. 7A-7F illustrate various example phases of joining a first structure to a second structure, according example implementations. An example first structure can include a component of the wing 102 of the aircraft 104, and an example second structure can include the wing skin 116 of the wing 102 of the aircraft 104. By joining the first structure and the second structure, a bondline is created between the first structure and the second structure. The first structure and the second structure can include other components of the wing 102 or other components of the aircraft 104 as well. For instance, in an example, the first structure 120 and the second structure 122 can be a fuselage stringer and fuselage skin. Other examples are possible as well.

Figure 3A:
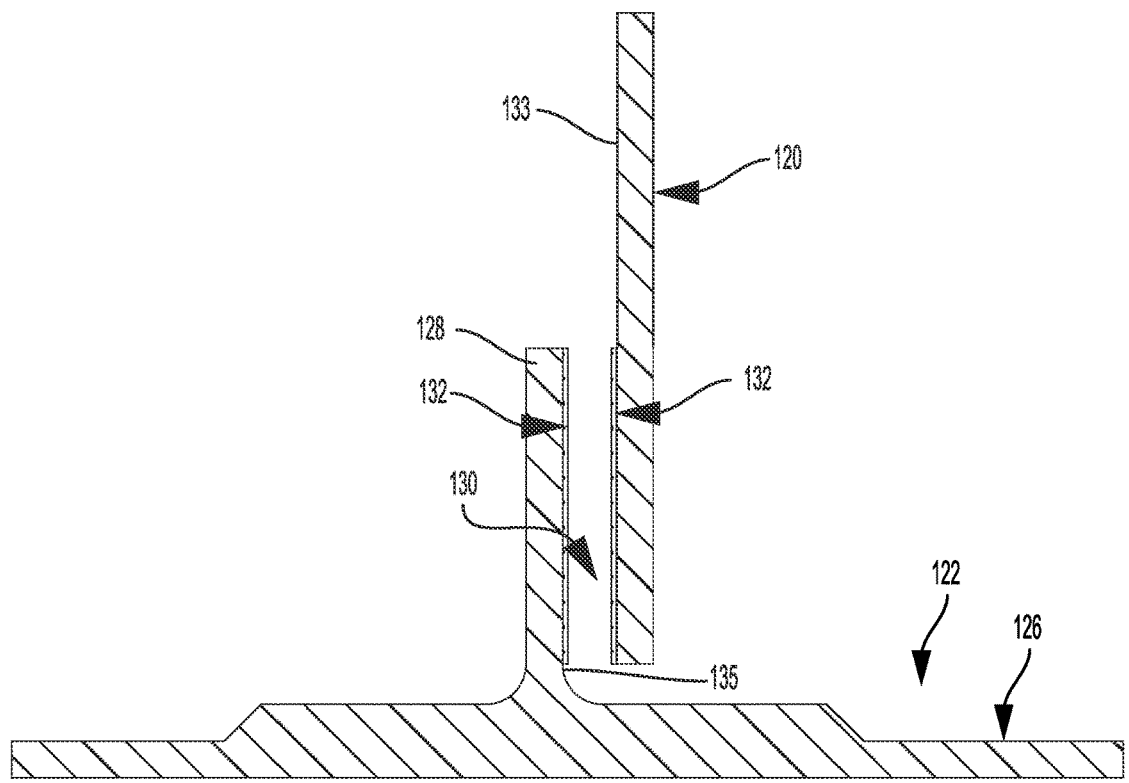
FIGS. 3A-3F illustrate an example process to join a first structure to a second structure in a single-shear configuration, according to an example implementation.

FIGS. 3A-3F illustrate an example process to join a first structure 120 to a second structure 122 in a single-shear configuration, according to an example implementation. In particular, FIG. 3A shows a cross-sectional view of an initial stage of joining the first structure 120 to the second structure 122. The first structure 120, which may be a component of a wing of an aircraft such as the spars 106, the wing ribs 110, or the longerons 112, is held in placed with one or more fixtures (not shown in FIG. 3A, which can include the fixture arms 108 of FIG. 1A) relative to the second structure 122, which can include or be the wing skin 116 of the wing of the aircraft.

As shown in FIG. 3A, the second structure 122 includes a base 126 and a flange 128 extending perpendicular to the base 126. The first structure 120 is held in place by the fixture(s) (e.g., example fixtures shown in FIG. 4) so that the first structure 120 is adjacent to and parallel with the flange 128. With the positioning of the first structure 120 held in place adjacent to and parallel with the flange 128 of the second structure 122, a bond cavity 130 is formed between the first structure 120 and the flange 128. Thus, the bond cavity 130 is formed between the first structure and the second structure 122 via positioning of the first structure 120 relative to the second structure 122.

Prior to positioning of the first structure 120 adjacent to and parallel with the flange 128 of the second structure 122, adhesive 132 is placed on a surface 133 of the first structure 120 that faces the flange 128, and adhesive 132 is also placed on a surface 135 of the flange 128 that faces the first structure 120. The adhesive 132 can be a layer of adhesive, as shown in FIG. 3A, that substantially covers surface area of the flange 128 and the first structure 120 over an area of each that will overlap when the flange 128 and the first structure 120 are brought together. For example, the adhesive 132 is shown to cover an entire (or a substantial portion) of the surface 135 of the flange 128 that faces the first structure 120 whereas the adhesive 132 may only cover half or a bottom portion of the surface 133 of the first structure 120 that faces the flange 128.

In some examples, the adhesive 132 may only be placed on one of the first structure 120 or the flange 128. It is desired to place the adhesive 132 such that the adhesive 132 results within the bond cavity 130 for bonding the first structure 120 to the second structure 122. The adhesive 132 is also pre-placed on each bonding surface 133/135 of the first structure 120 and the second structure 122 prior to joining the first structure 120 and the second structure 122.

Figure 3B:
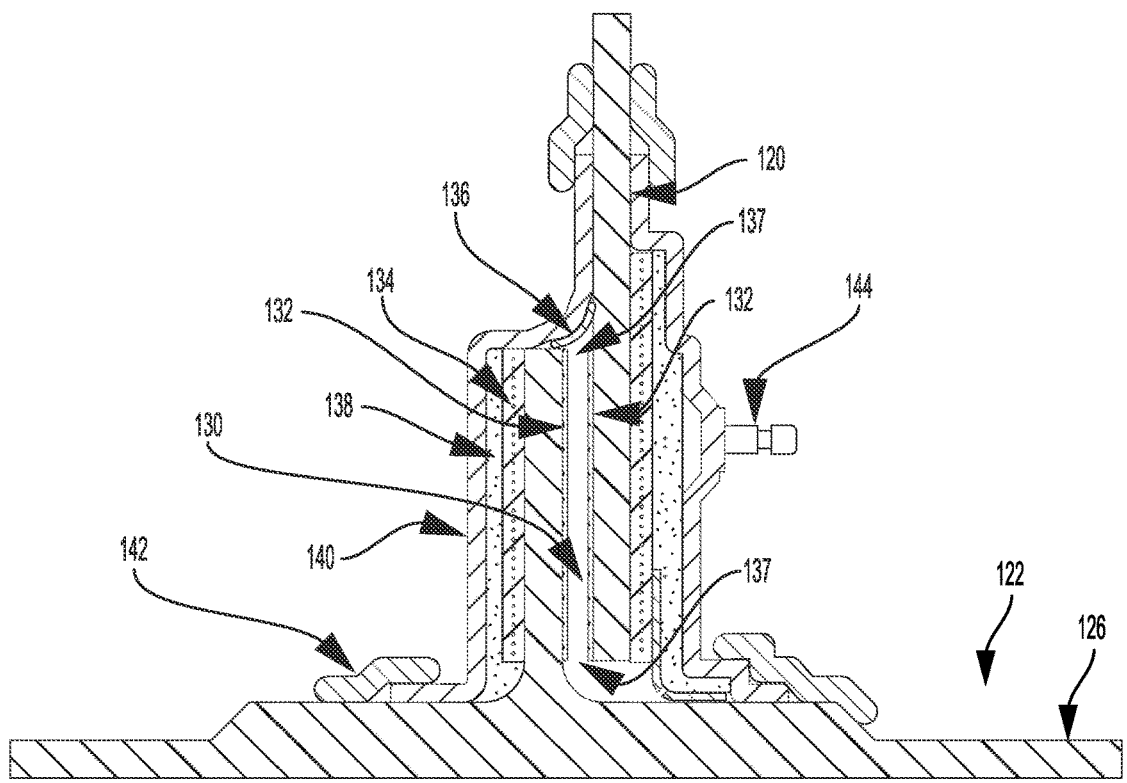

FIG. 3B illustrates a cross-sectional view of a subsequent stage in which a heater 134, such as a heat blanket, is positioned adjacent to the bond cavity 130, by surrounding the flange 128 and the first structure 120, for example. Following, perforated adhesive tape 136 is placed at one or more exits 137 of the bond cavity 130 to allow vacuum through and to block flow of adhesive, for example. A semi-permeable breather material 138 is then placed over the perforated adhesive tape 136 at one or more exits 137 of the bond cavity 130. The semi-permeable breather material 138 will assist to entrap the adhesive 132 when joining the first structure 120 to the second structure 122, for example. The semi-permeable breather material 138 can include a material such as foam or rubber, for example. The semi-permeable breather material 138 can also include open cell foam, or semi-porous fiberglass material, for example.

Then, a vacuum bag 140 is secured to the first structure 120 and the second structure 122 so as to surround a portion of the first structure 120 and the second structure 122. Vacuum seal tape 142 is used to create a vacuum seal attachment of the vacuum bag 140 to the first structure 120 and the second structure 122.

The vacuum bag 140 is applied to each side of the first structure 120 and the second structure 122 to create a sealed enclosure. The vacuum bag 140 is placed around the heater 134 as well. The vacuum bag 140 can include a silicon rubber sheet or nylon film, for example.

In some examples, the heater 134 is optional, and a separate heating element is incorporated into the vacuum bag 140. Still other forms of heating can be provided as well, such as forced air that convectively heats the adhesive or induction heating when inductable media is placed at or near the bond cavity 130.

In FIG. 3B, a vacuum port 144 is also coupled to the vacuum bag 140 for evacuating the bond cavity 130 via a vacuum (not shown).

Figure 3C:
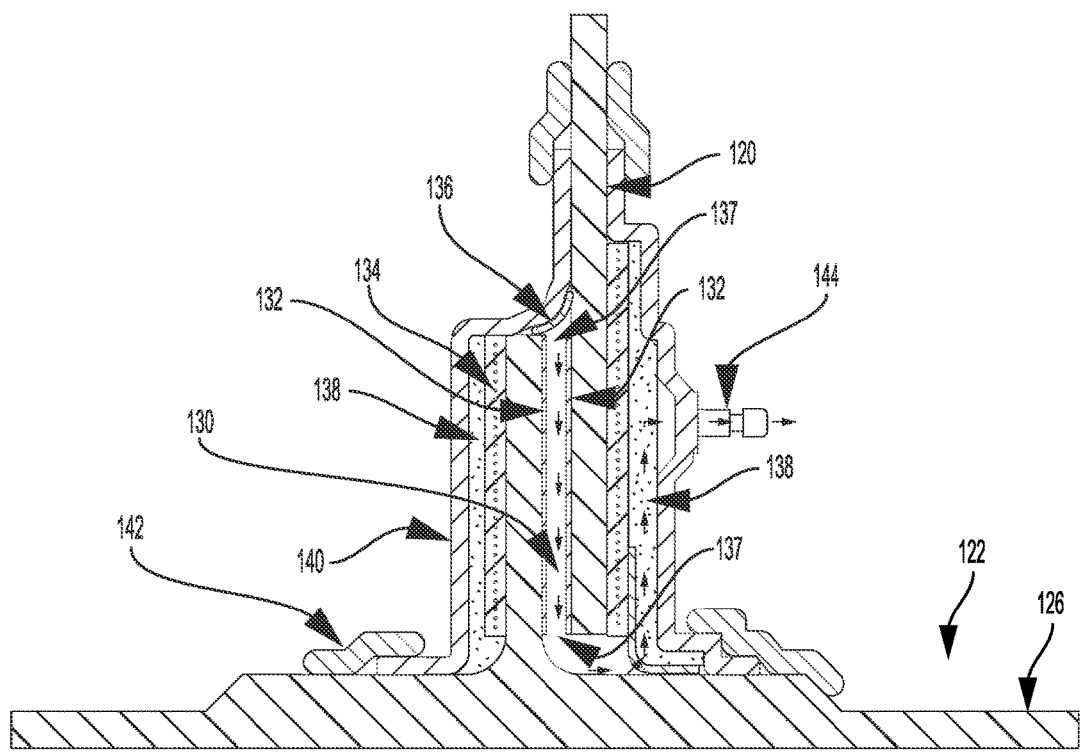

FIG. 3C illustrates a cross-sectional view of a subsequent stage in which the bond cavity 130 is evacuated via the vacuum port 144 to deaerate the bond cavity 130 as well as to deaerate the adhesive 132 within the bond cavity 130. Arrows are shown to illustrate air drawn out of the bond cavity 130 and out of the adhesive 132 and through the perforated adhesive tape 136 and the semi-permeable breather material 138, and then out through the vacuum port 144. The semi-permeable breather material 138 allows air to pass, but will prevent the adhesive 132 from flowing out of the bond cavity 130. The air is evacuated from all areas within the vacuum bag 140, for example, in order to evacuate all air out of areas where the adhesive 132 is placed to enable a voidfree bondline to be created between the first structure 120 and the second structure 122.

Further, by pre-placing the adhesive 132 on the first structure 120 and the second structure 122, the adhesive 132 is de-aerated during evacuation of the bond cavity 130 to further enable a voidfree bondline to be created. De-aerated adhesive has no air, and thus, no voids or trapped air bubbles will be present.

Note that the adhesive 132 illustrated in FIGS. 3A-3B includes air bubbles and has not yet been de-aerated. As seen by comparing FIG. 3B with 3C, the evacuation of the bond cavity 130 removes air from the adhesive 132.

Figure 3D:
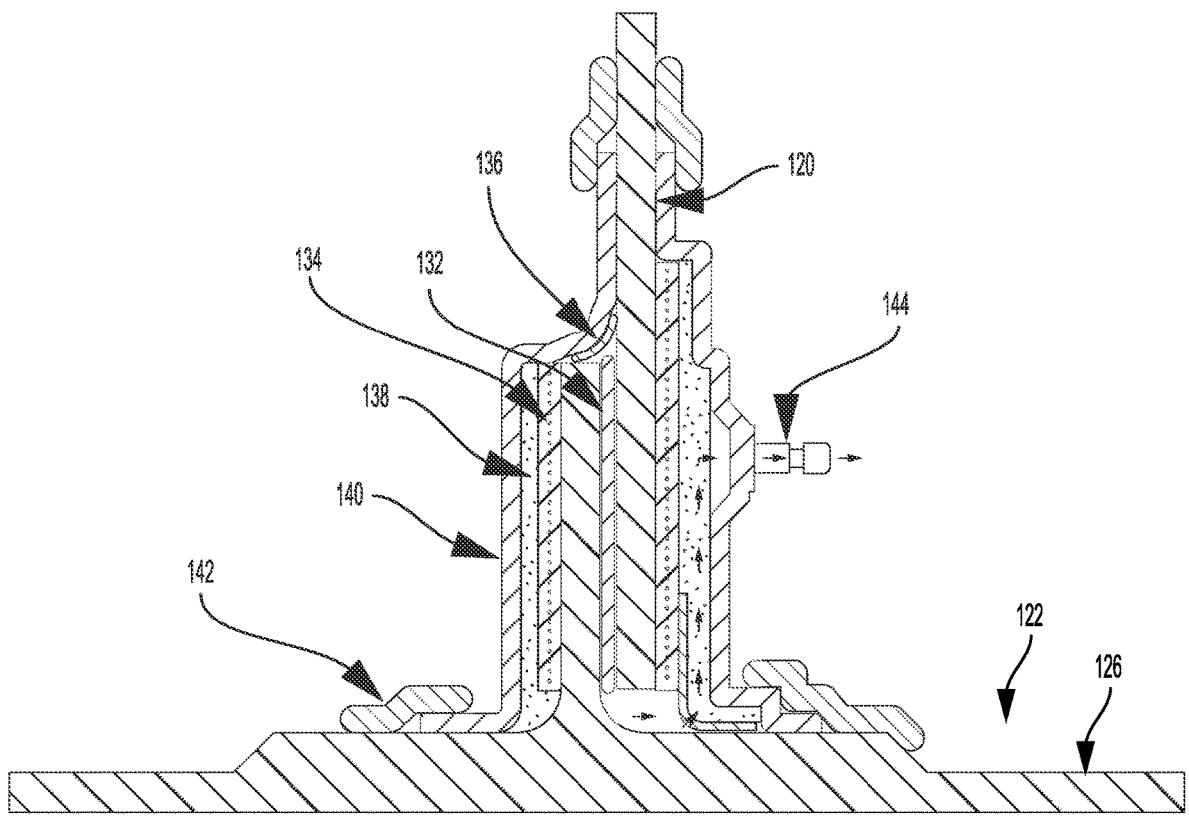

FIG. 3D illustrates a cross-sectional view of a subsequent stage in which after deaerating the adhesive 132, the first structure 120 and the second structure 122 are moved relative to one another such that deaerated adhesive is disposed between the first structure 120 and the second structure 122. To do so, the first structure 120 may be moved toward the second structure 122, which can be stationary. Alternatively, the second structure 122 can be moved toward the first structure 120, which can be stationary. Still alternatively, both the first structure 120 and the second structure 122 can be moved in a relative manner toward one another.

FIG. 3D illustrates the first structure 120 and the second structure 122 moved relative to one another so that each bonding surface 133/135 of the first structure 120 and the second structure 122 move toward each other causing the deaerated adhesive 132 to be disposed in the bond cavity 130 between the first structure 120 and the second structure 122 resulting in the deaerated adhesive 132 joining and bonding the first structure 120 to the second structure 122. For example, fixtures (not shown in FIG. 3D) move the first structure 120 and the second structure 122 relative to each other so that the deaerated adhesive 132 on each of the first structure 120 and the second structure 122 contacts and forms a bondline.

In the example shown in FIG. 3D, the bond cavity 130 is continuously evacuated via the vacuum port 144 while moving the first structure 120 and the second structure 122 relative to one another. It may be beneficial to continue evacuation via the vacuum port 144 to prevent any air from seeping back into the bond cavity 130.

Figure 3E:
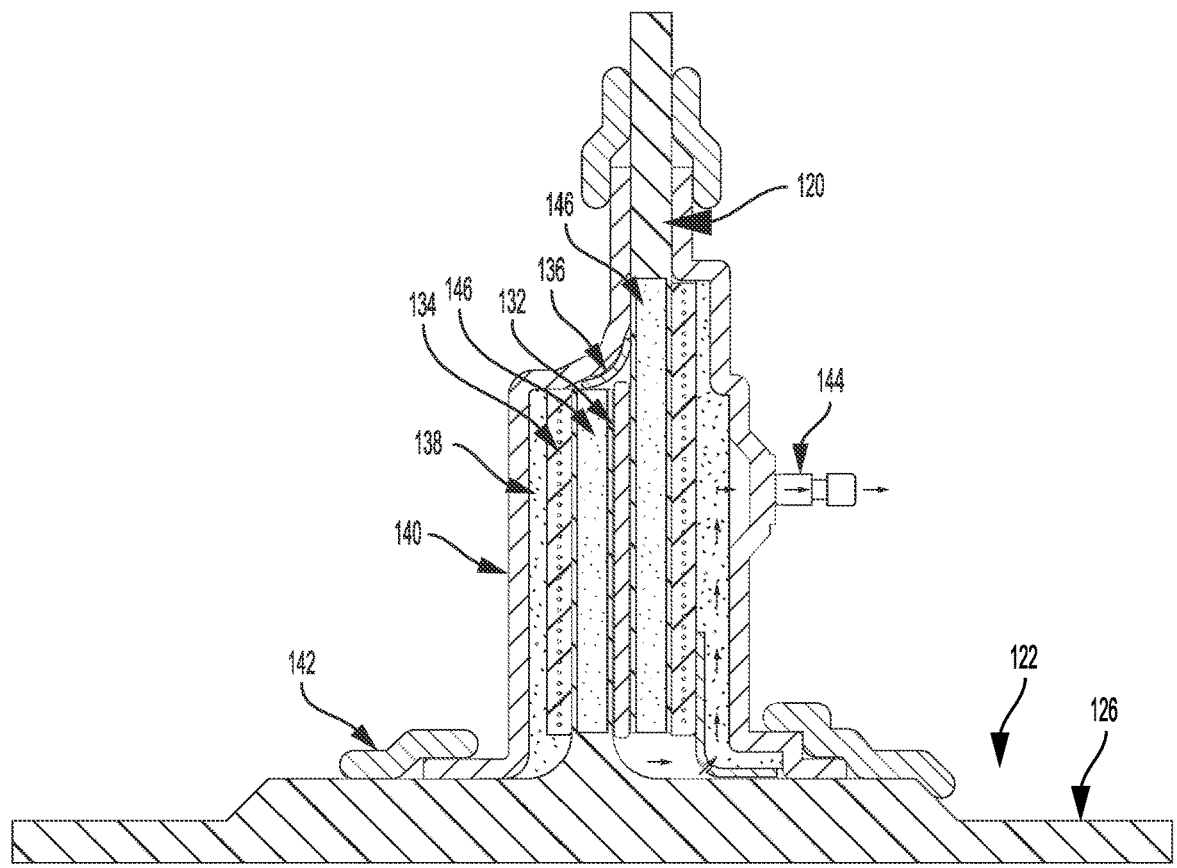

FIG. 3E illustrates a cross-sectional view of a subsequent stage in which the deaerated adhesive 132 disposed between the first structure 120 and the second structure 122 is cured, via the heater 134, to bond the first structure 120 to the second structure 122. In FIG. 3D, the heater 134 is activated causing heat 146 to flow through the first structure 120, the flange 128 and to the deaerated adhesive 132. The heater 134 can include a silicon rubber pad with resistive elements (e.g., flexible wires running through the pad) to provide resistance heating, for example.

As shown in FIG. 3E, during curing of the deaerated adhesive 132, the vacuum continuously evacuates the bond cavity 130. In other examples, however, during curing of the deaerated adhesive 132, the vacuum can be shut off (manually or using an electronic valve).

Figure 3F:
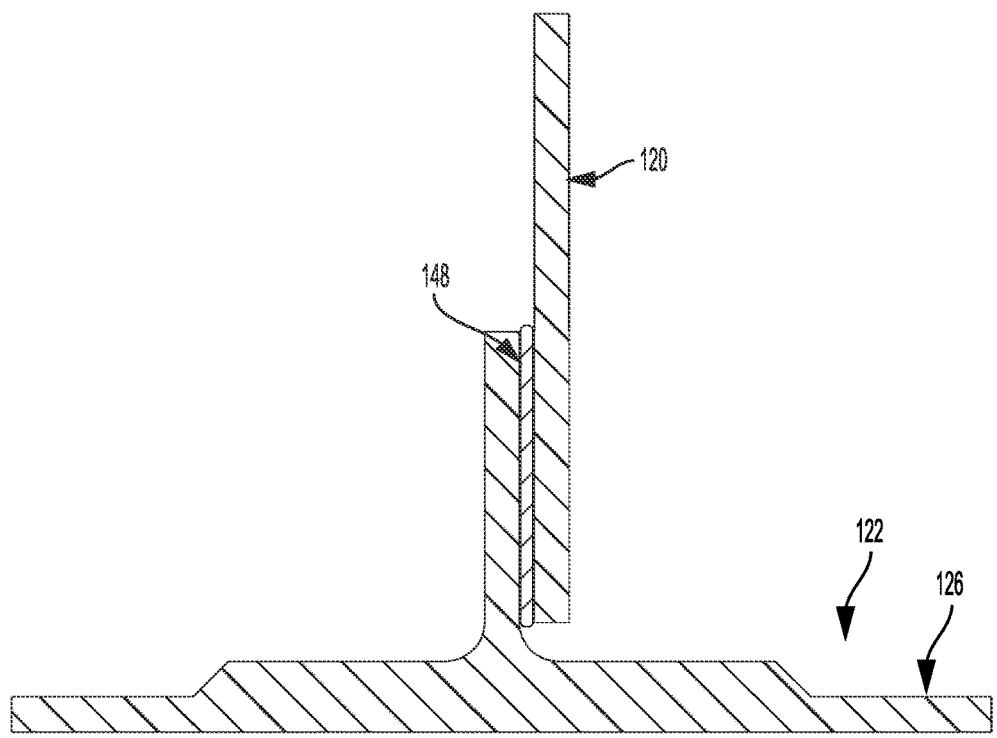

FIG. 3F illustrates a cross-sectional view of a subsequent stage in which the heater 134 is turned off and components are removed from the first structure 120 and the second structure 122, and any excess adhesive is trimmed at edges resulting in a bondline 148 being formed to join the first structure 120 and the second structure 122. The bondline 148 is a voidfree bondline, for example.

FIG. 4 illustrates an example of a system 150 for joining the first structure 120 and the second structure 122, according to an example implementation. The system 150 includes one or more fixtures 152 and 154 forming the bond cavity 130 between the first structure 120 and the second structure 122 via positioning of the first structure 120 relative to the second structure 122 and to cause movement of the first structure 120 and the second structure 122 relative to one another. The system 150 also includes the vacuum bag 140 to secure the first structure 120 and the second structure 122 by surrounding a portion of the first structure 120 and the second structure 122. The system 150 also includes the vacuum port 144 coupled to the vacuum bag 140 for evacuating the bond cavity 130 to deaerate the adhesive 132 within the bond cavity 130 such that deaerated adhesive is disposed between the first structure 120 and the second structure 122. The system also includes one or more heaters (e.g., the heater 134) for curing the deaerated adhesive disposed between the first structure 120 and the second structure 122 to bond the first structure 120 to the second structure 122.

In FIG. 4, the fixtures 152 and 154 are shown coupled to the first structure 120 and the second structure 122 using a temporary adhesive 151. The fixture 152 can include a slider rod 153 movable within a translation sleeve 155 to enable movement of the first structure 120 relative to the second structure 122, for example.

The system 150 in FIG. 4 can include more or fewer components as well, such as any of the additional components described in FIGS. 3A-3F, for example.

FIGS. 5A-5E illustrate another example process to join the first structure 120 to the second structure 122, according to an example implementation. The processes illustrated in FIGS. 5A-5E are similar to those illustrated in FIGS. 3A-3F, however, in the examples in FIGS. 5A-5E, collapsible standoffs 156 and 158 are positioned between the first structure 120 and the second structure 122 to control a position of the first structure 120 relative to the second structure 122.

Figure 5A:
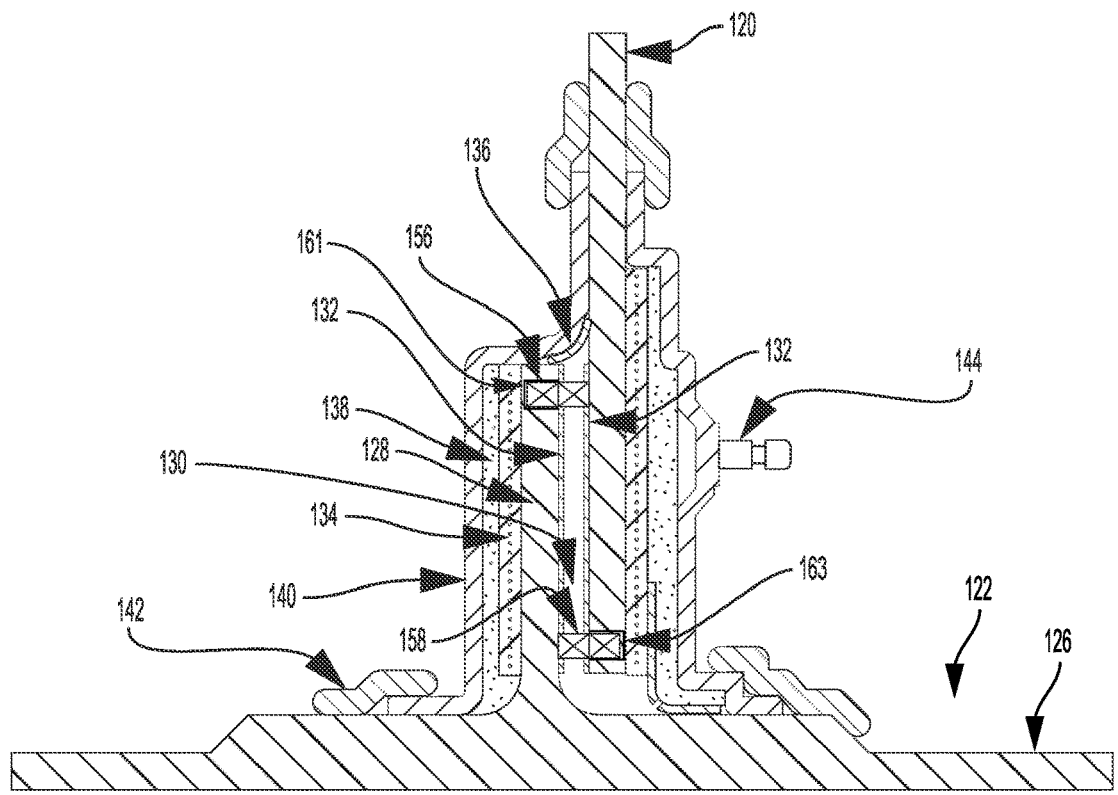
FIGS. 5A-5E illustrate another example process to join the first structure to the second structure, according to an example implementation.

As shown in FIG. 5A, the second structure 122 includes the base 126 and the flange 128 extending perpendicular to the base 126. The first structure 120 is held in place by the fixture(s) (e.g., example fixtures shown in FIG. 4) so that the first structure 120 is adjacent to and parallel with the flange 128. With the positioning of the first structure 120 held in place adjacent to and parallel with the flange 128 of the second structure 122, the bond cavity 130 is formed between the first structure 120 and the flange 128.

Prior to positioning of the first structure 120 adjacent to and parallel with the flange 128 of the second structure 122, adhesive 132 is placed on a surface of the first structure 120 that faces the flange 128, and adhesive 132 is also placed on a surface of the flange 128 that faces the first structure 120.

In addition, the collapsible standoffs 156 and 158 are used to control a position of the first structure 120 relative to the second structure 122, and are inserted between the first structure 120 and the second structure 122. In one example, the collapsible standoff 156 is placed in a hole 161 of a surface of the second structure 122, and the surface of the second structure 122 is configured to move toward the first structure 120. Adhesive 132 can be placed in the hole 161 of the surface of the second structure 122 to bond the collapsible standoff 156 in place. Similarly, the collapsible standoff 158 is placed in a hole 163 of a surface of the first structure 120, and the surface of the first structure 120 is configured to move toward the second structure 122. Adhesive 132 can be placed in the hole 163 of the surface of the first structure 120 to bond the collapsible standoff 158 in place.

In other examples, the collapsible standoffs 156 and 158 are positioned in the adhesive 132 and remain in place on the first structure 120 and the second structure 122.

Other components shown in FIG. 5A that are the same as shown in FIGS. 3A-3F are not described again for simplicity and include the heater 134, the perforated adhesive tape 136, the semi-permeable breather material 138, the vacuum bag 140, the vacuum seal tape 142, and the vacuum port 144.

After positioning the components, the first structure 120 and the second structure 122 are moved relative to one another by forcing the first structure 120 against the collapsible standoff 156 to contact the collapsible standoff 156, and by forcing the second structure 122 against the collapsible standoff 158 to contact the collapsible standoff 158 and cause the adhesive to be positioned between the first structure 120 and the second structure 122.

Figure 5B:
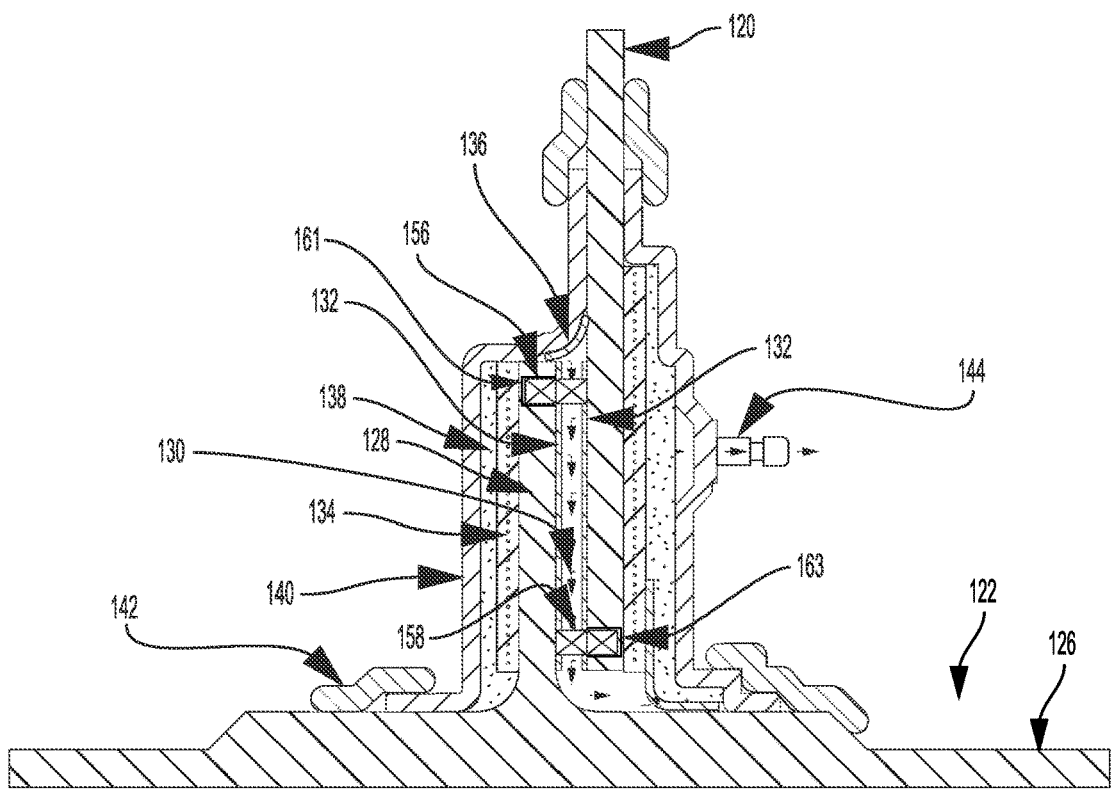

FIG. 5B illustrates a cross-sectional view of a subsequent stage in which the bond cavity 130 is evacuated via the vacuum port 144 to deaerate the bond cavity 130 as well as to deaerate the adhesive 132 within the bond cavity 130. Arrows are shown to illustrate air drawn out of the bond cavity 130 and out of the adhesive 132 and through the perforated adhesive tape 136 and the semi-permeable breather material 138, and then out through the vacuum port 144. The semi-permeable breather material 138 allows air to pass, but will prevent the adhesive 132 from flowing out of the bond cavity 130. The air is evacuated from all areas within the vacuum bag 140, for example, in order to evacuate all air out of areas where the adhesive 132 is placed to enable a voidfree bondline to be created between the first structure 120 and the second structure 122.

Further, by pre-placing the adhesive 132 on the first structure 120 and the second structure 122, the adhesive 132 is de-aerated during evacuation of the bond cavity 130 to further enable a voidfree bondline to be created. De-aerated adhesive has no air, and thus, no voids or trapped air bubbles will be present.

Figure 5C:
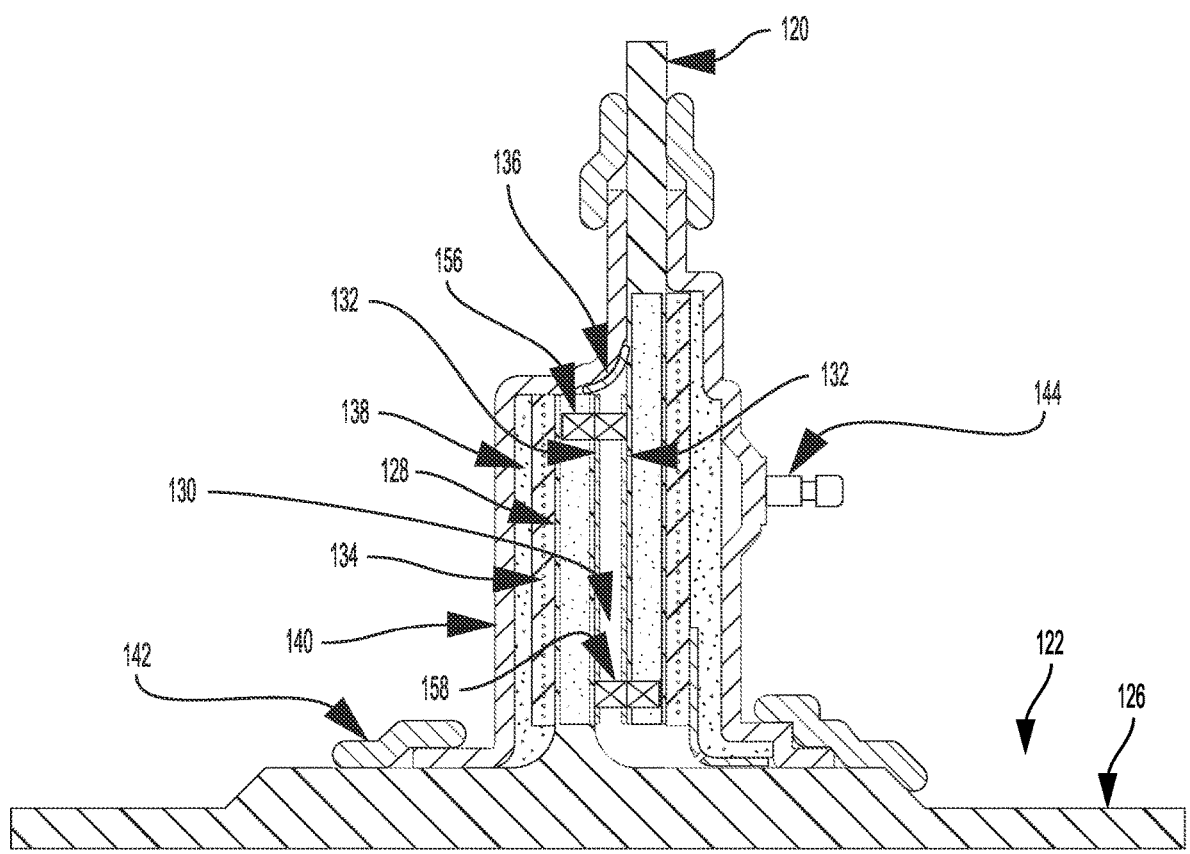

FIG. 5C illustrates a cross-sectional view of a subsequent stage in which heat is applied by the heater 134. In FIG. 5C, the heater 134 is turned on causing heat to flow through the first structure 120, the flange 128 and the adhesive 132. The heater 134 can include a silicon rubber pad with resistive elements (e.g., flexible wires running through the pad) to provide resistance heating, for example.

When heating, the collapsible standoffs 156 and 158 collapse at a predetermined temperature due to thermal softening of the collapsible standoffs 156 and 158 to enable a bondline to form between the first structure 120 and the second structure 122. The collapsible standoffs 156 and 158 are structures designed with materials that soften under temperature and pressure combinations, and can be fabricated using additive manufacturing, for example. For instance, the collapsible standoffs 156 and 158 may include thermoplastic material, materials fabricated from fiber reinforced plastics, materials that may be compatible or may cross-link with the adhesive 132 of the bond, materials fabricated from adhesive that has or is modified to have a higher melting temperature to thereby maintain a standoff or separation of the first structure 120 from the second structure 122 until a threshold temperature is reached.

Within examples, the collapsible standoffs 156 and 158 are a spiral or spring-like configuration, a truss configuration, a hollow column configuration, or a wireframe-like configuration. In other examples, the collapsible standoffs 156 and 158 include guide pin configurations to provide component alignment and merging guidance, and the guide pins may be pressed into pre-drilled holes in the first structure 120 and the second structure 122 with the collapsible standoffs 156 and 158 positioned over the guide pins.

In still other examples, the collapsible standoffs 156 and 158 include a solenoid in a shoulder bolt to provide guide and controllable collapsibility that is electrically or pneumatically actuated.

Within examples, the collapsible standoffs 156 and 158 collapse in a one-dimensional manner while providing alignment and spacing between the first structure 120 and the second structure 122.

Figure 5D:
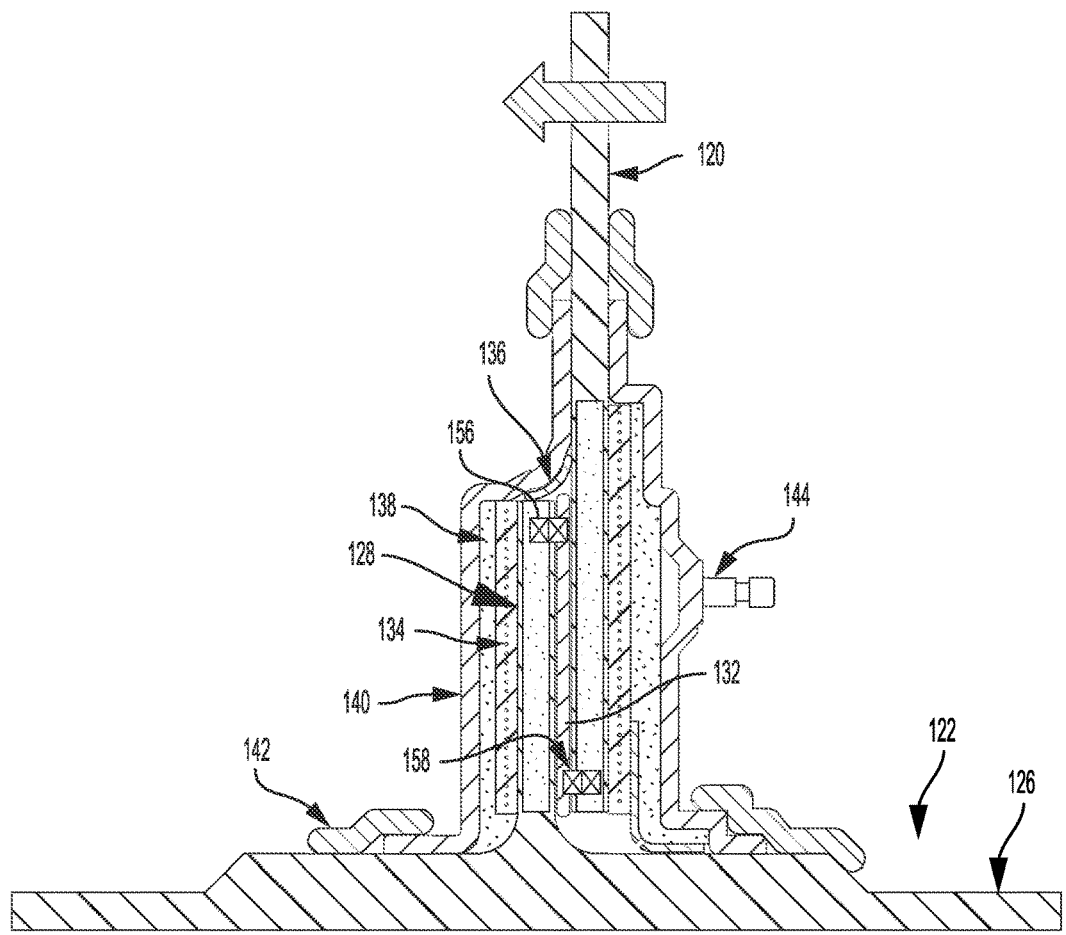

FIG. 5D illustrates a cross-sectional view of a subsequent stage in which the heat is applied by the heater 134 and the collapsible standoffs 156 and 158 have been caused to collapse due to heating and thermal softening at a predetermined temperature. During this time, the bond cavity 130 can be continuously evacuated via the vacuum port 144 drawing the first structure 120 and the second structure 122 toward each other due to vacuum pressure, for example. The vacuum pressure also assists with causing the collapse of the collapsible standoffs 156 and 158.

In some examples, heat is applied to achieve a first temperature to cause the collapsible standoffs 156 and 158 to collapse resulting in the first structure 120 and the second structure 122 moving toward each other due to vacuum pressure, and then heat is applied to achieve a second temperature higher than the first temperature to cure the deaerated adhesive 132 and bond the first structure 120 to the second structure 122. In one example, the collapsible standoffs 156 and 158 have a melting point of about 170° F. and the adhesive 132 has a cure temperature of about 350° F. Thus, the collapsible standoffs 156 and 158 soften and collapse after reaching the first temperature of about 170° F., and then the heat is increased to the cure temperature to cure the adhesive 132.

Figure 5E:
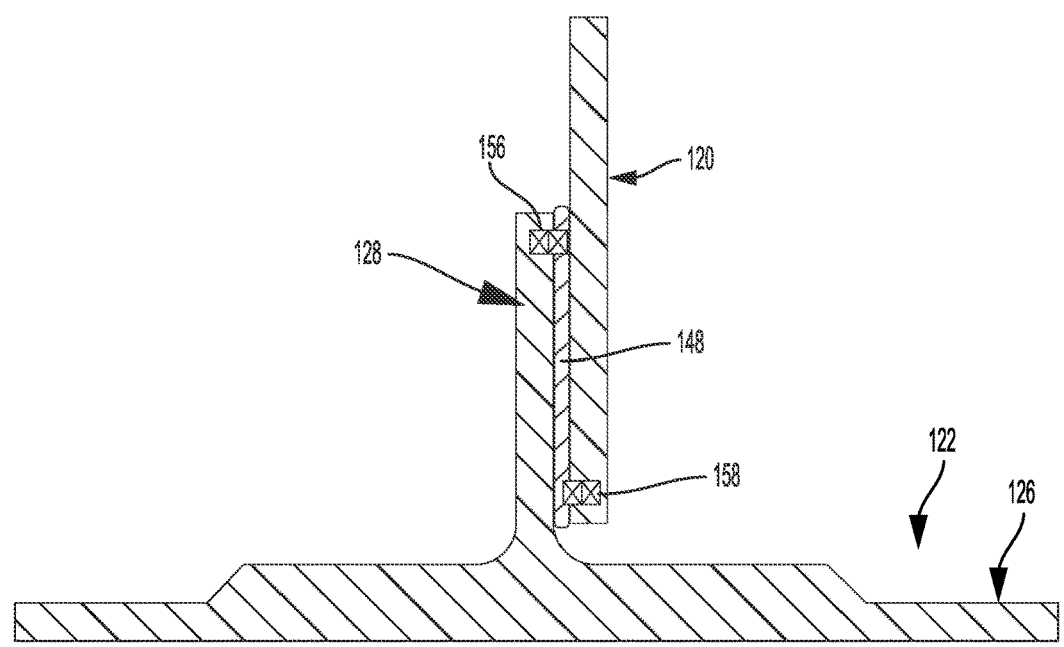

FIG. 5E illustrates a cross-sectional view of a subsequent stage in which the heater 134 is turned off and components are removed from the first structure 120 and the second structure 122, and any excess adhesive is trimmed at edges resulting in a bondline 148 being formed to join the first structure 120 and the second structure 122. The bondline 148 is a voidfree bondline, for example. A thickness of the bondline 148 between the first structure 120 and the second structure 122 is controlled via a residual thickness of the collapsed collapsible standoffs 156 and 158.

FIGS. 6A-6G illustrate an example process to join the first structure 120 to the second structure 122 in a dual-shear configuration, according to an example implementation. The processes illustrated in FIGS. 6A-6G are similar to those illustrated in FIGS. 3A-3F, however, in the examples in FIGS. 6A-6G, the second structure 122 has two flanges rather than one flange and the first structure 120 is positioned between the two flanges of the second structure 122.

Figure 6A:
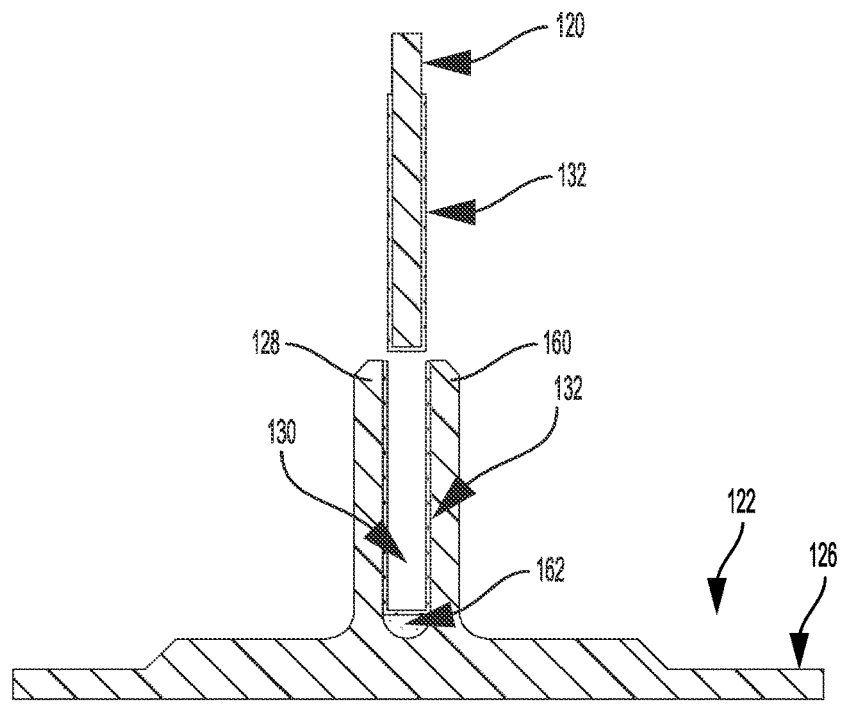
FIGS. 6A-6G illustrate an example process to join the first structure to the second structure in a dual-shear configuration, according to an example implementation.

As shown in FIG. 6A, the second structure 122 includes the base 126, the flange 128 extending perpendicular to the base 126, and the flange 160 also extending perpendicular to the base 126. The first structure 120 is held in place by the fixture(s) (e.g., example fixtures shown in FIG. 4) so that the first structure 120 can be positioned into the area between the flange 128 and the flange 160. With the positioning of the first structure 120 into the area between the flange 128 and the flange 160, the bond cavity 130 is formed.

A spacer 162 is inserted into a bottom area of the bond cavity 130 to prohibit adhesive accumulation. For example, it is desirable to avoid that overfilling the bond cavity with adhesive, and thus, the spacer 162 is placed to prevent adhesive from filling the area. In one example, the spacer 162 includes a closed cell foam elastic member. The spacer 162 also controls insertion depth of the first structure 120 relative to the second structure 122.

Prior to inserting the first structure 120 between the flange 128 and the flange 160, the adhesive 132 is generally placed on a surface of the first structure 120 that will contact the flange 128 and the flange 160, and adhesive 132 is also placed on surfaces of the flange 128 and the flange 160.

Figure 6B:
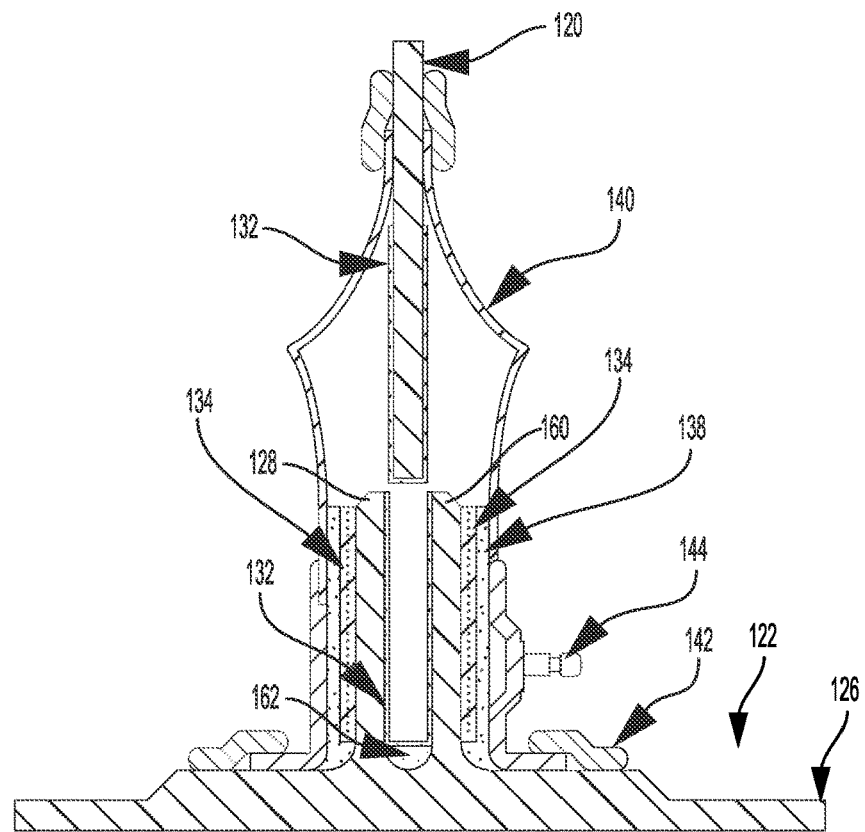

FIG. 6B illustrates a cross-sectional view of a subsequent stage in which other components are applied including the heater 134, the semi-permeable breather material 138, the vacuum bag 140, the vacuum seal tape 142, and the vacuum port 144. These components are the same as shown in FIGS. 3A-3F and are not described again for simplicity. Note that in the example shown in FIG. 6B, the vacuum bag 140 has semi rigid and flexible portion to enable movement of the parts, and the example includes two heaters (e.g., heaters 134) on each side of the second structure 122.

Figure 6C:
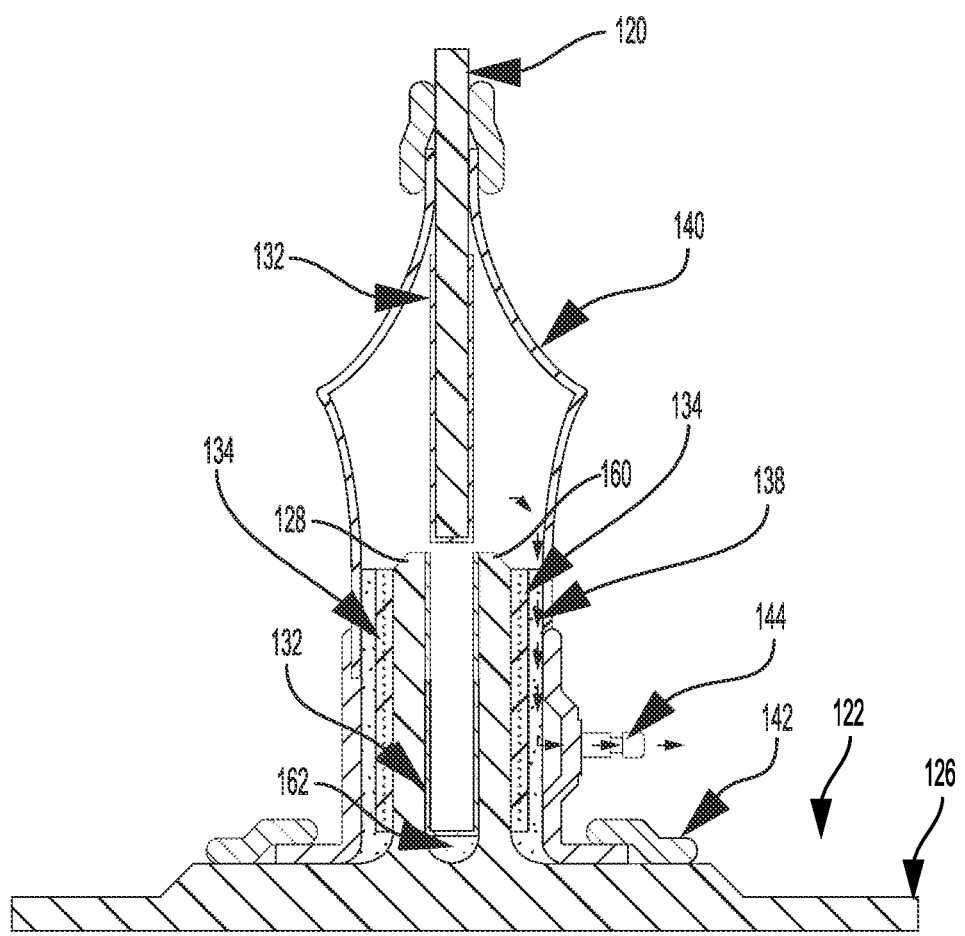

FIG. 6C illustrates a cross-sectional view of a subsequent stage in which after positioning the components, the bond cavity 130 is evacuated via the vacuum port 144 to deaerate the bond cavity 130 as well as to deaerate the adhesive 132 within the bond cavity 130.

Figure 6D:
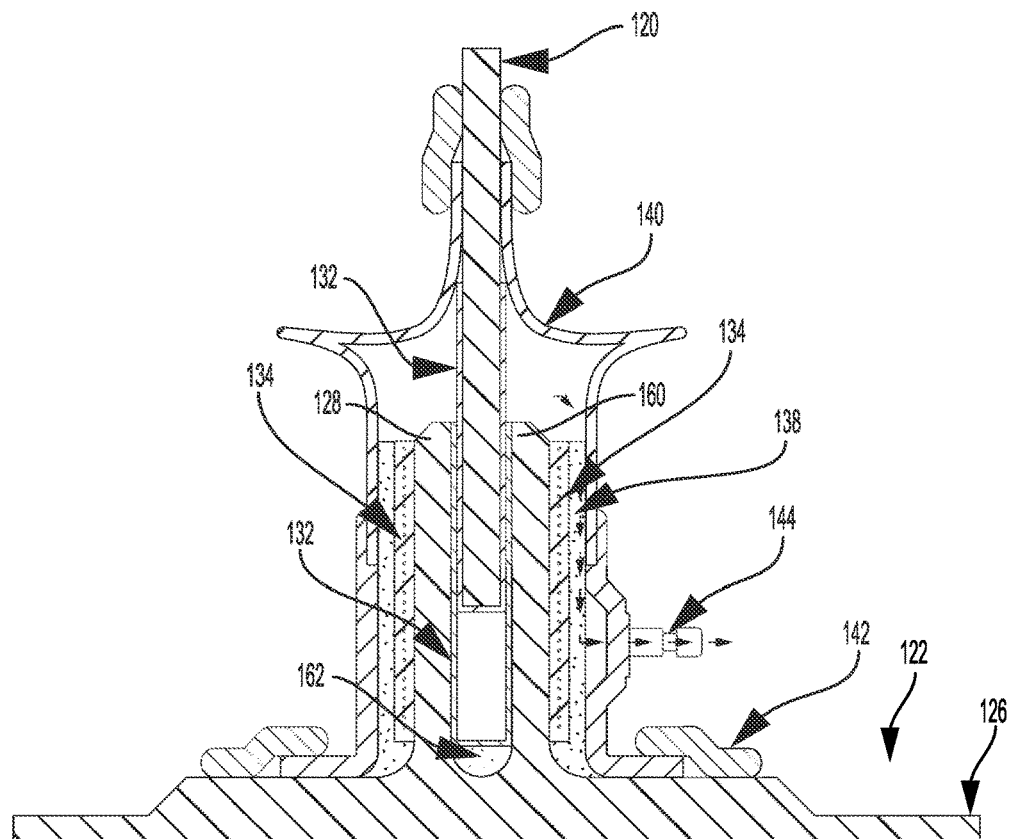

FIG. 6D illustrates a cross-sectional view of a subsequent stage in which the first structure 120 is moved relative to the second structure 122 after the adhesive 132 has been deaerated, so as to position the first structure 120 between the flange 128 and the flange 160. The bond cavity 130 continues to be evacuated during the movement. Arrows are shown to illustrate air drawn out of the bond cavity 130 and out of the adhesive 132 and through the semi-permeable breather material 138, and then out through the vacuum port 144. Further, by pre-placing the adhesive 132 on the first structure 120 and the second structure 122, the adhesive 132 is de-aerated during evacuation of the bond cavity 130 to further enable a voidfree bondline to be created. De-aerated adhesive has no air, and thus, no voids or trapped air bubbles will be present.

After deaerating the adhesive 132, the first structure 120 and the second structure 122 are moved relative to one another such that deaerated adhesive is disposed between the first structure 120 and the second structure 122. To do so, the first structure 120 may be moved toward the second structure 122, which can be stationary. Alternatively, the second structure 122 can be moved toward the first structure 120, which can be stationary. Still alternatively, both the first structure 120 and the second structure 122 can be moved in a relative manner toward one another.

Figure 6E:
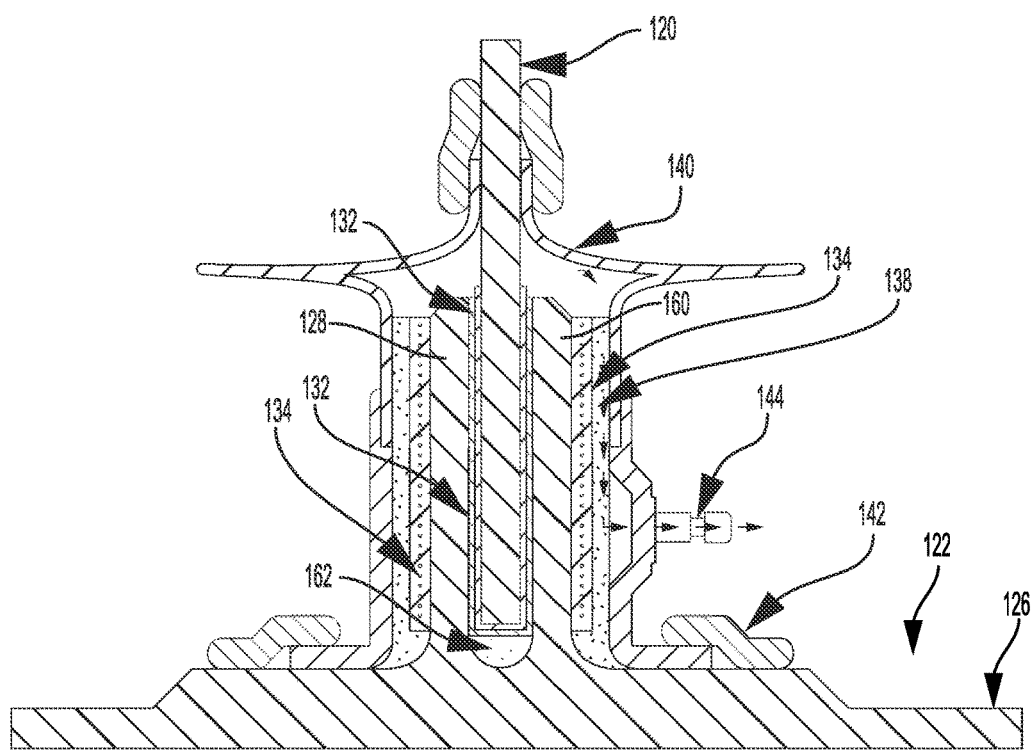

FIG. 6E illustrates a cross-sectional view of a subsequent stage in which the first structure 120 is further moved relative to the second structure 122 so as to position the first structure 120 between the flange 128 and the flange 160, and to contact the spacer 162 at a bottom of the bond cavity 130. In the example shown in FIG. 6E, the bond cavity 130 is continuously evacuated via the vacuum port 144 while moving the first structure 120 and the second structure 122 relative to one another. It may be beneficial to continue evacuation via the vacuum port 144 to prevent any air from seeping back into the bond cavity 130.

Figure 6F:
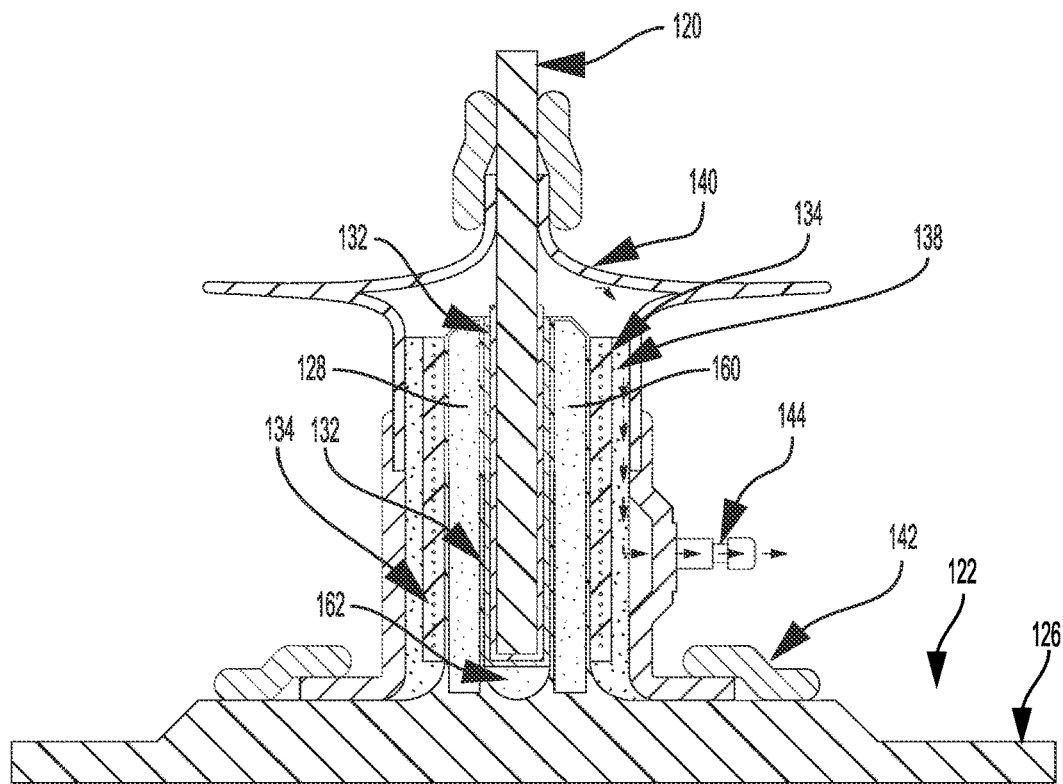

FIG. 6F illustrates a cross-sectional view of a subsequent stage in which the deaerated adhesive 132 disposed between the first structure 120 and the second structure 122 is cured, via the heater 134, to bond the first structure 120 to the second structure 122. In FIG. 6F, the heater 134 is turned on causing heat to flow through the first structure 120, the flange 128, the flange 160, and the adhesive 132. The heater 134 can include a silicon rubber pad with resistive elements (e.g., flexible wires running through the pad) to provide resistance heating, for example.

As shown in FIG. 6F, during curing of the adhesive 132, the vacuum continuously evacuates the bond cavity 130. In other examples, however, during curing of the adhesive 132, the vacuum can be shut off (manually or using an electronic valve).

Figure 6G:
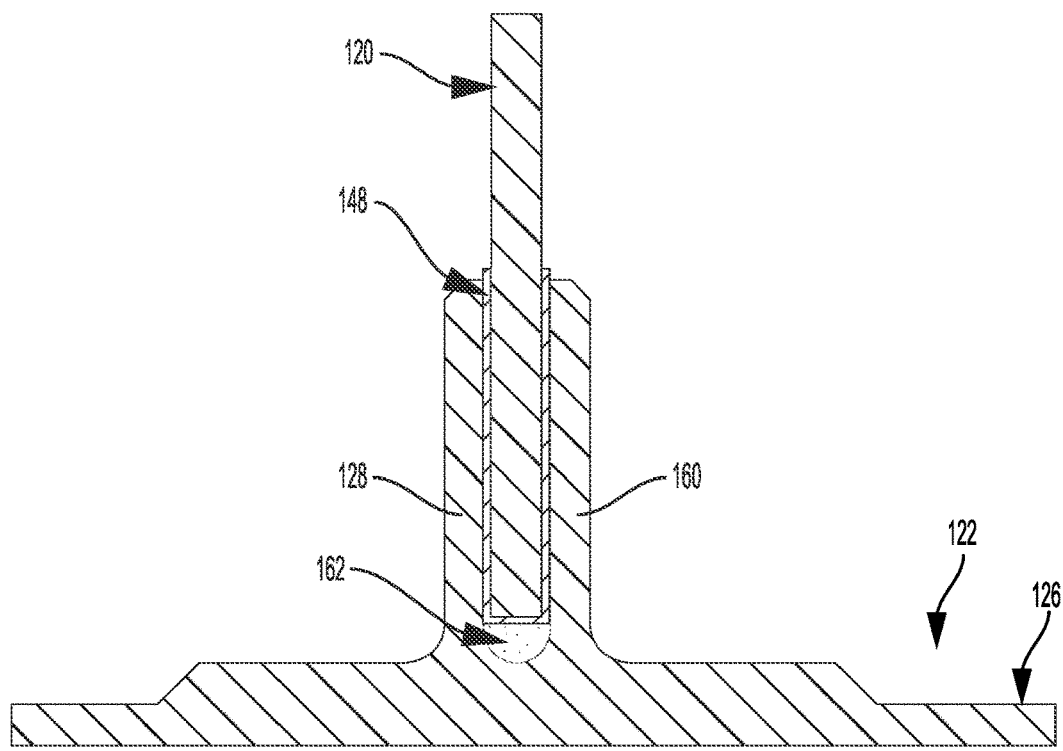

FIG. 6G illustrates a cross-sectional view of a subsequent stage in which the heater 134 is turned off and components are removed from the first structure 120 and the second structure 122, and any excess adhesive is trimmed at edges resulting in a bondline 148 being formed to join the first structure 120 and the second structure 122. The bondline 148 is a voidfree bondline, for example.

FIGS. 7A-7F illustrate another example process to join the first structure 120 to the second structure 122, according to an example implementation. The processes illustrated in FIGS. 7A-7F are similar to those illustrated in FIGS. 6A-6G, however, in the examples in FIGS. 7A-7E, a collapsible standoff 164 is positioned at a bottom of the bond cavity 130.

Figure 7A:
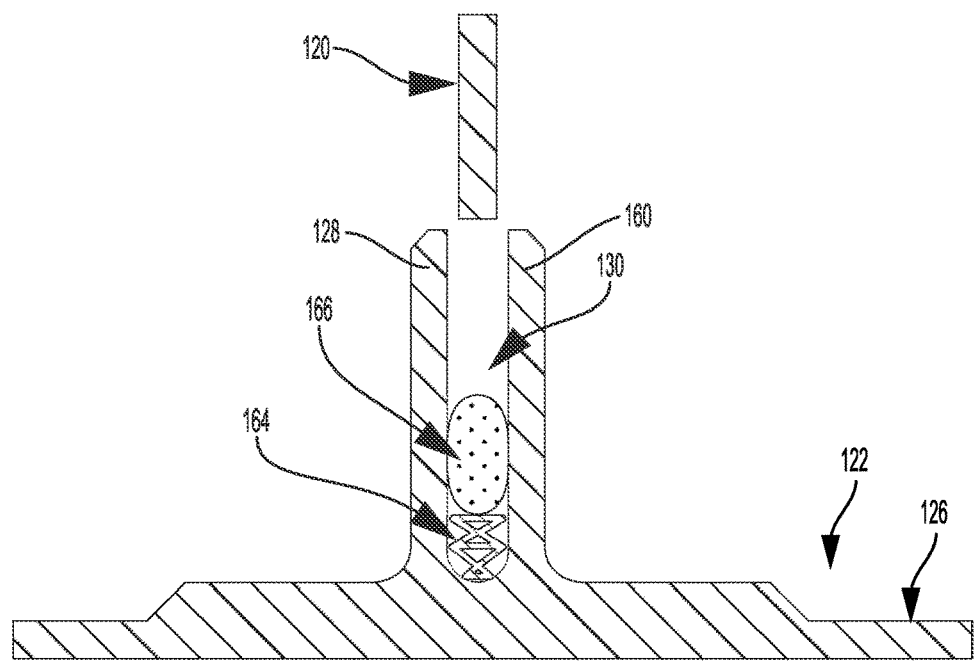
FIGS. 7A-7F illustrate another example process to join the first structure to the second structure, according to an example implementation.

As shown in FIG. 7A, the second structure 122 includes the base 126, the flange 128 extending perpendicular to the base 126, and the flange 160 also extending perpendicular to the base 126. The first structure 120 is held in place by the fixture(s) (e.g., example fixtures shown in FIG. 4) so that the first structure 120 can be positioned into the area between the flange 128 and the flange 160. With the positioning of the first structure 120 into the area between the flange 128 and the flange 160, the bond cavity 130 is formed.

The collapsible standoff 164 is inserted into a bottom area of the bond cavity 130 to control bondline thickness. The collapsible standoff 164 also controls a distance that the first structure 120 extends into the bond cavity 130 based on temperature. For example, the collapsible standoff 164 will collapse once heated to a threshold temperature allowing compression of the collapsible standoff 164.

An amount of adhesive 166 is then inserted into the bond cavity 130 on top of the collapsible standoff 164. The adhesive 166 of FIG. 7A is not de-aerated.

Figure 7B:
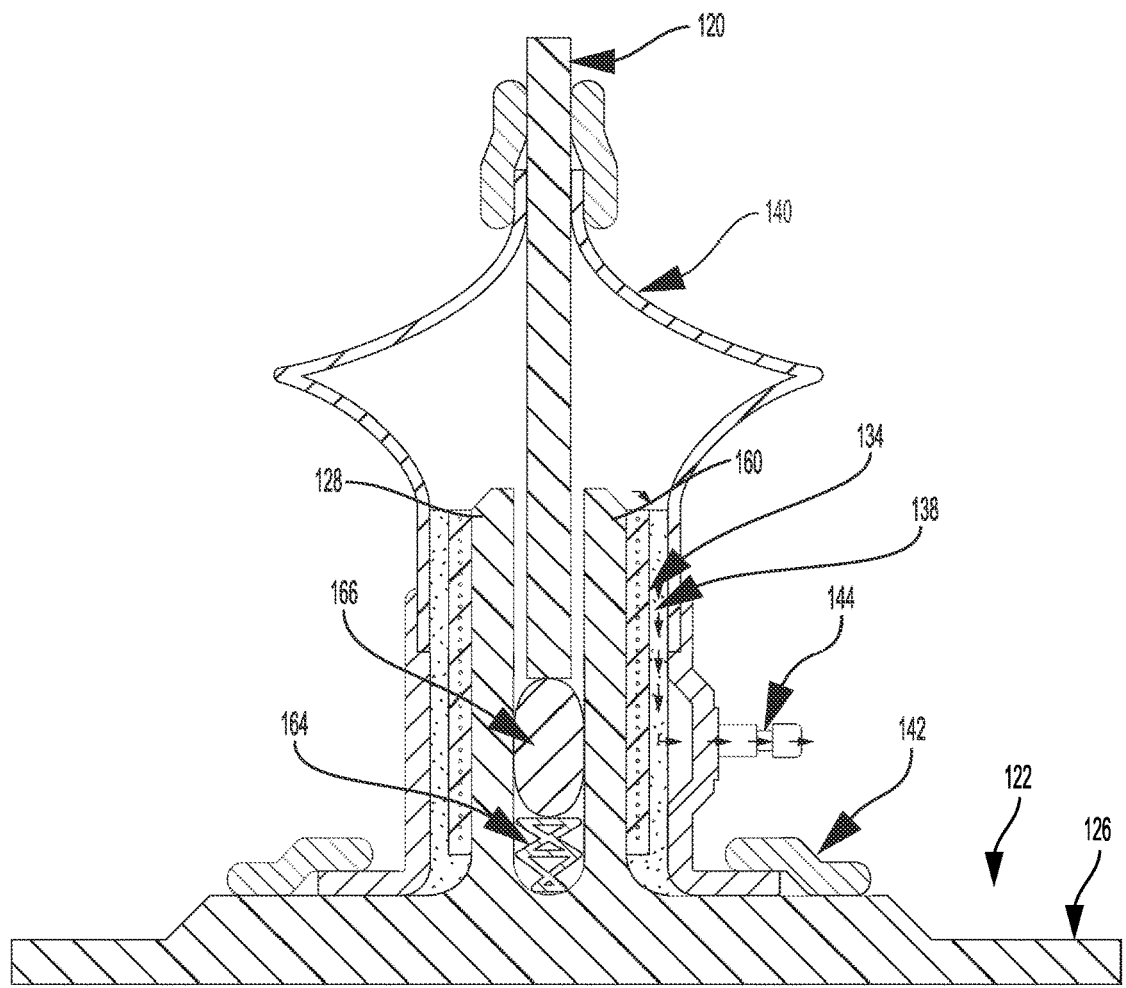

FIG. 7B illustrates a cross-sectional view of a subsequent stage in which other components are applied including the heater 134, the semi-permeable breather material 138, the vacuum bag 140, the vacuum seal tape 142, and the vacuum port 144. These components are the same as shown in FIGS. 6A-6E and are not described again for simplicity.

After positioning the components, the bond cavity 130 is evacuated via the vacuum port 144 to deaerate the bond cavity 130 as well as to deaerate the adhesive 166 within the bond cavity 130. As can be seen by comparing FIG. 7A with 7B, evacuation of the bond cavity 130 removes air from the adhesive 166.

Figure 7C:
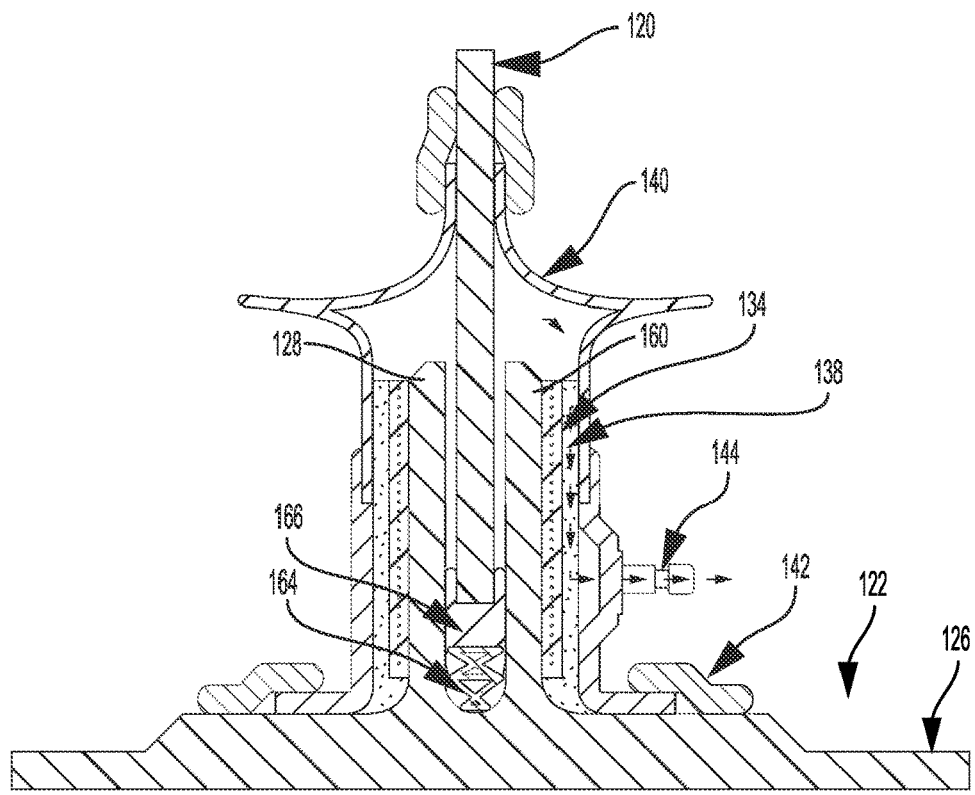
Figure 7D:
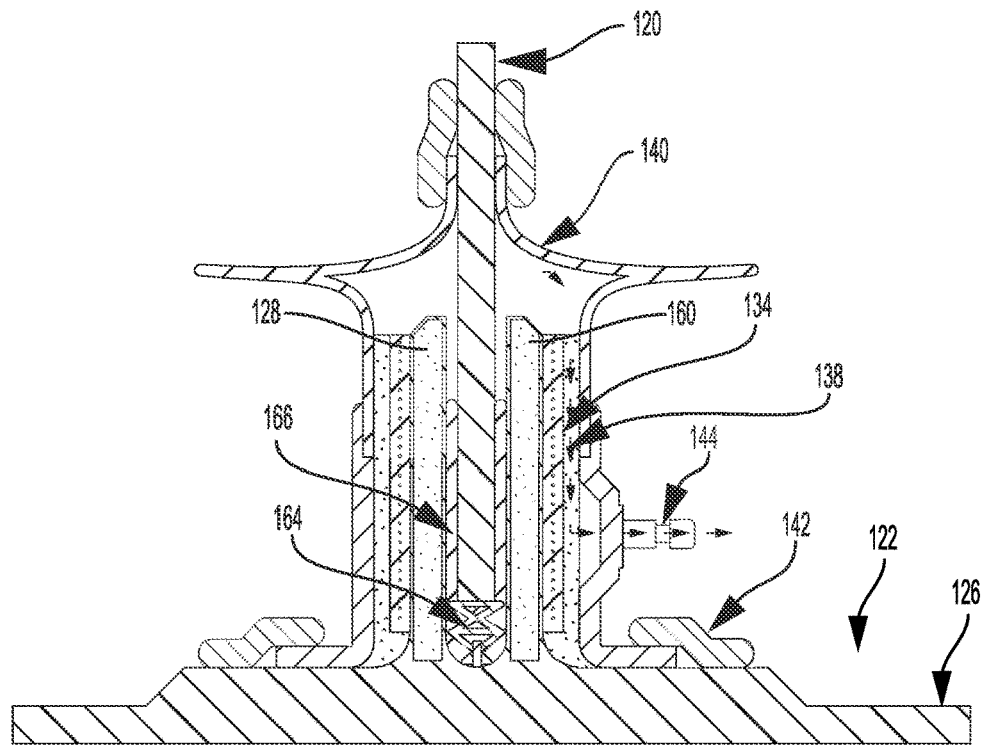

FIG. 7C illustrates a cross-sectional view of a subsequent stage in which the first structure 120 is moved relative to the second structure 122 so as to position the first structure 120 between the flange 128 and the flange 160. The bond cavity 130 continues to be evacuated during the movement. Arrows are shown to illustrate air drawn out of the bond cavity 130 and out of the adhesive 166 and through the semi-permeable breather material 138, and then out through the vacuum port 144. Further, by pre-placing the adhesive 166 in the bond cavity 130, the adhesive 166 is de-aerated during evacuation of the bond cavity 130 to further enable a voidfree bondline to be created. De-aerated adhesive has no air, and thus, no voids or trapped air bubbles will be present.

By moving the first structure 120 into the bond cavity 130, the first structure 120 contacts the adhesive 166 causing the adhesive to surround the first structure 120, for example. Further movement of the first structure 120 into the bond cavity 130 causes the adhesive 166 to fill the bond cavity. In addition, capillarity will induce a uniform fill of the bond cavity 130 with the adhesive 166, for example.

Figure 7E:
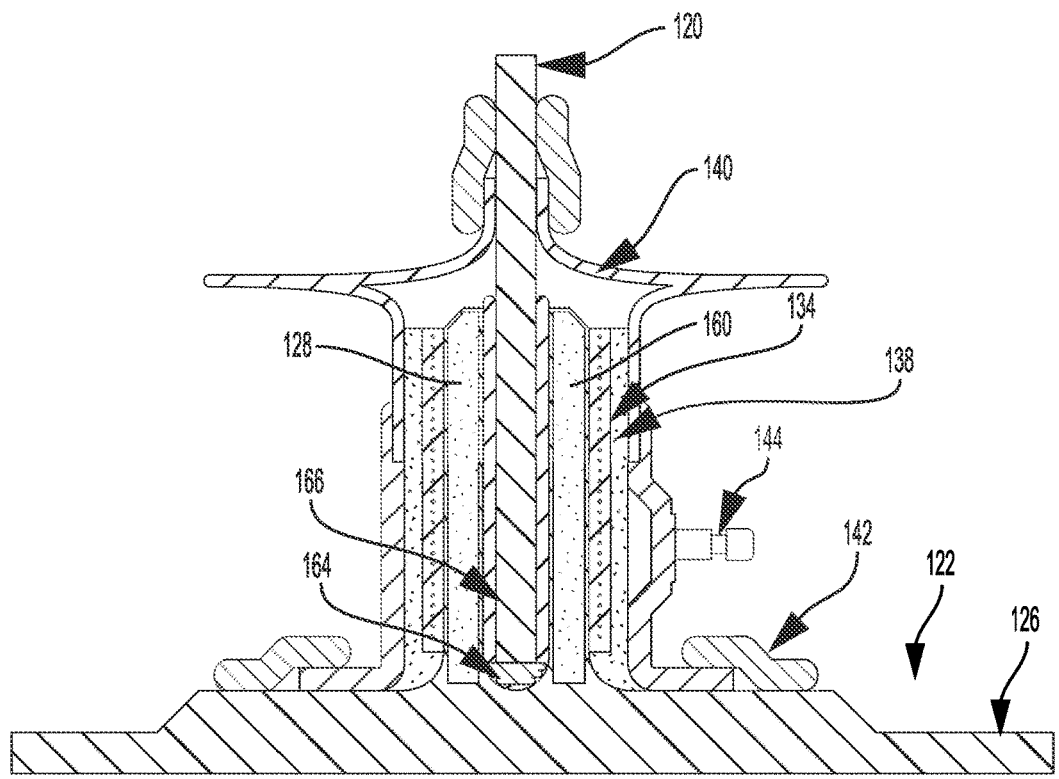

FIG. 7E illustrates a cross-sectional view of a subsequent stage in which the deaerated adhesive 166 disposed between the first structure 120 and the second structure 122 is cured, via the heater 134, to bond the first structure 120 to the second structure 122. The adhesive 166 is illustrated as filling the bond cavity 130, as mentioned, due to capillarity and movement of the first structure 120. In FIG. 7E, the heater 134 is turned on causing heat to flow through the first structure 120, the flange 128, the flange 160, and the adhesive 166. The heater 134 can include a silicon rubber pad with resistive elements (e.g., flexible wires running through the pad) to provide resistance heating, for example.

As shown in FIG. 7E, during curing of the adhesive 166, the vacuum continuously evacuates the bond cavity 130. In other examples, however, during curing of the adhesive 166, the vacuum can be shut off (manually or using an electronic valve).

When heating, the collapsible standoff 164 collapses at a predetermined temperature due to thermal softening of the collapsible standoff 164 to enable a bondline to form between the first structure 120 and the second structure 122. The collapsible standoff 164 may be the same as or fabricated use the same materials as the collapsible standoffs 156 and 158, for example.

Figure 7F:
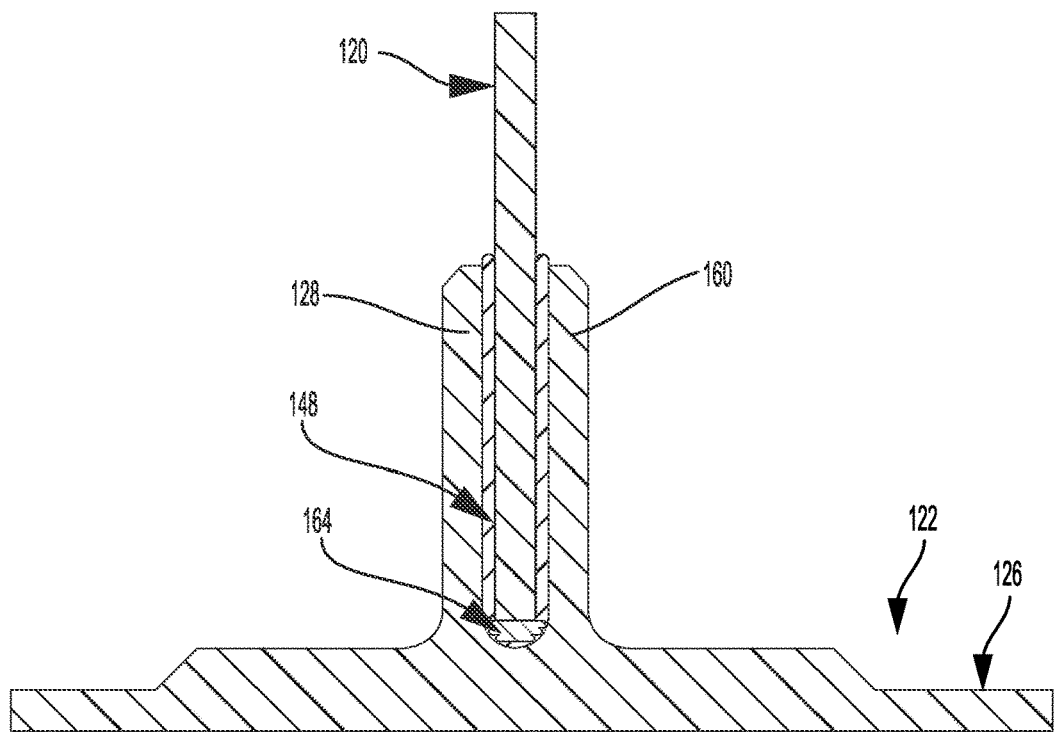

FIG. 7F illustrates a cross-sectional view of a subsequent stage in which the heater 134 is turned off and components are removed from the first structure 120 and the second structure 122, and any excess adhesive is trimmed at edges resulting in a bondline 148 being formed to join the first structure 120 and the second structure 122. The bondline 148 is a voidfree bondline, for example. A thickness of the bondline 148 between the first structure 120 and the second structure 122 is controlled via a residual thickness of the collapsed collapsible standoff 164.

Figure 8:
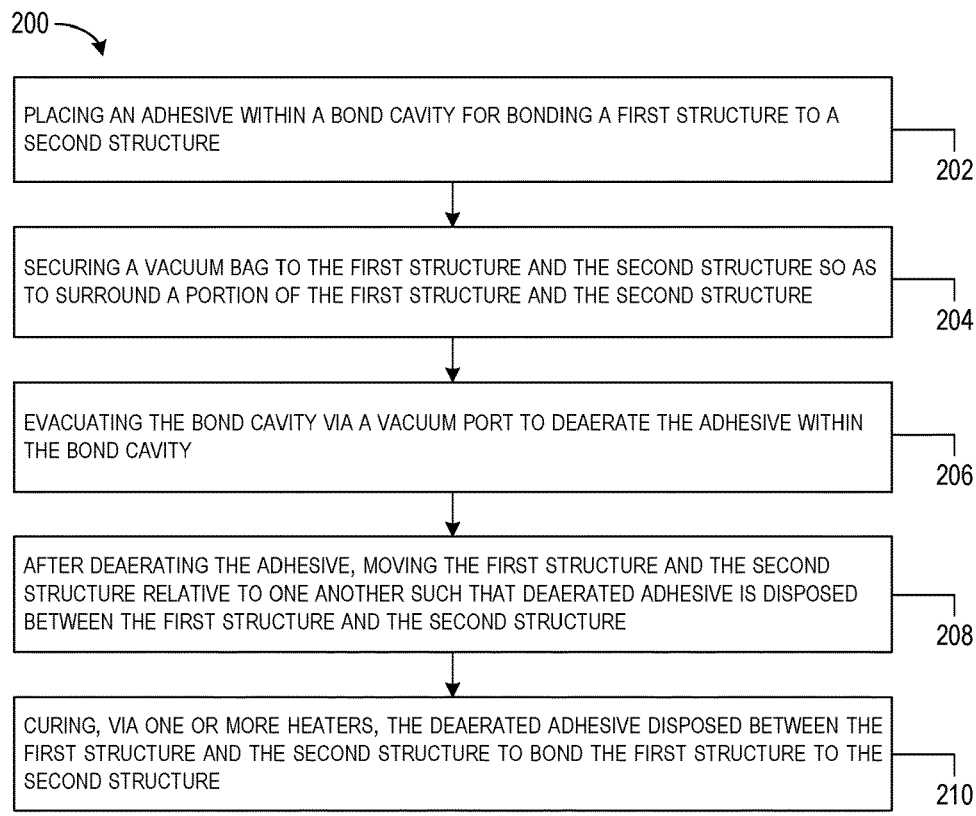
FIG. 8 illustrates a flowchart of an example of a method of joining a first structure and a second structure, according to an example implementation.

FIG. 8 illustrates a flowchart of an example of a method 200 of joining a first structure 120 and a second structure 122, according to an example implementation. Method 200 shown in FIG. 8 presents an example of a method that could be used with the system 150 or with components of thereof. Further, the functions described with respect to FIG. 8 may be supplemented by, replaced by, or combined with functions and phases described above with respect to FIGS. 3A-3F, FIG. 4, FIGS. 5A-5E, FIGS. 6A-6G, and FIGS. 7A-7F, for example. Further, devices or systems may be used or configured to perform logical functions presented in FIG. 8.

In one example, the method 200, and any of the phases shown in FIGS. 3-7, is considered a choreographed adhesive de-aeration process in which stages of the process when performed in order provide a de-aerated adhesive useful to join the first structure 120 and the second structure 122 to form a bondline.

In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 200 includes one or more operations, functions, or actions as illustrated by one or more of blocks 202-210. Further, blocks of FIGS. 9-22 may be performed in accordance with one or more of blocks 202-210. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Within examples, one or more blocks of the method 200 may be represented in program code or circuitry used for controlling robotic mechanisms for joining the first structure and the second structure (e.g., as for assembling a bonded structure and/or a wing including a plurality of bonded structures). While method 200 and variations thereof may be executed automatically using, for example, one or more robotic armatures controlled by program code operating in accordance with the method 200, some tasks may be performed manually. Thus, within examples, certain functionality described with respect to the method 200 may be performed automatically while other portions can be performed manually. Alternatively, all blocks of the method 200 may be performed automatically or all blocks of the method 200 may be performed manually.

At block 202, the method 200 includes placing the adhesive 132 within the bond cavity 130 for bonding the first structure 120 to the second structure 122.

Figure 9:
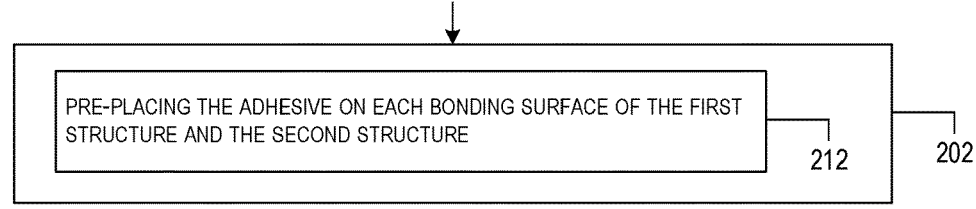
FIG. 9 illustrates a flowchart of functions for use with the method shown in FIG. 8, according to an example implementation.

FIG. 9 illustrates a flowchart of functions for use with the method 200 shown in FIG. 8, according to an example implementation. In particular, FIG. 9 illustrates block 212, which includes an example function for placing the adhesive 132 within the bond cavity 130 for bonding the first structure 120 to the second structure 122 including pre-placing the adhesive 132 on each bonding surface of the first structure 120 and the second structure 122.

Figure 10:
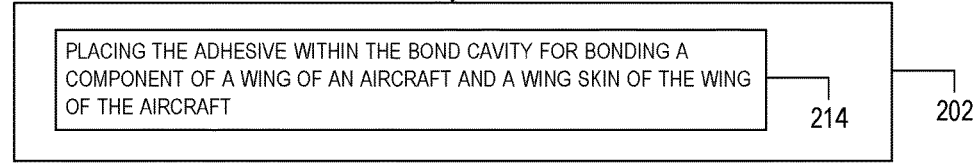
FIG. 10 illustrates a flowchart of functions for use with the method shown in FIG. 8, according to an example implementation.

FIG. 10 illustrates a flowchart of functions for use with the method 200 shown in FIG. 8, according to an example implementation. In particular, FIG. 10 illustrates block 214, which includes an example function for placing the adhesive 132 within the bond cavity 130 for bonding the first structure 120 to the second structure 122 including placing the adhesive 132 within the bond cavity 130 for bonding a component of a wing of an aircraft and a wing skin of the wing of the aircraft.

Referring back to FIG. 8, at block 204, the method 200 includes securing the vacuum bag 140 to the first structure 120 and the second structure 122 so as to surround a portion of the first structure 120 and the second structure 122.

At block 206, the method 200 includes evacuating the bond cavity 130 via the vacuum port 144 to deaerate the adhesive 132 within the bond cavity 130.

At block 208, the method 200 includes after deaerating the adhesive 132, moving the first structure 120 and the second structure 122 relative to one another such that deaerated adhesive is disposed between the first structure 120 and the second structure 122.

Figure 11:
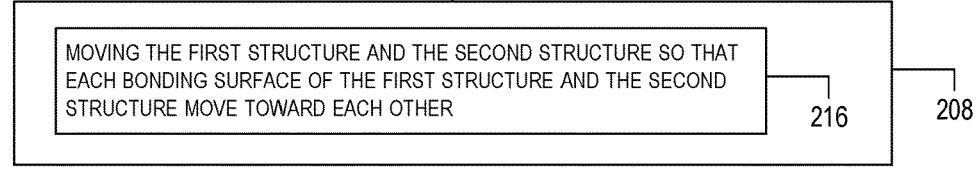
FIG. 11 illustrates a flowchart of functions for use with the method shown in FIG. 8, according to an example implementation.

FIG. 11 illustrates a flowchart of functions for use with the method 200 shown in FIG. 8, according to an example implementation. In particular, FIG. 11 illustrates block 216, which includes an example function for moving the first structure 120 and the second structure 122 relative to one another including moving the first structure 120 and the second structure 122 so that each bonding surface of the first structure 120 and the second structure 122 move toward each other.

Referring back to FIG. 8, at block 210, the method 200 includes curing, via one or more heaters 134, the deaerated adhesive disposed between the first structure 120 and the second structure 122 to bond the first structure 120 to the second structure 122.

FIG. 12 illustrates a flowchart of additional functions for use with the method 200 shown in FIG. 8, according to an example implementation. In particular, FIG. 12 illustrates block 218, which includes an example function for forming the bond cavity 130 between the first structure 120 and the second structure 122 via positioning of the first structure 120 relative to the second structure 122.

FIG. 13 illustrates a flowchart of additional functions for use with the method 200 shown in FIG. 8, according to an example implementation. In particular, FIG. 13 illustrates block 220, which includes an example function for moving the first structure 120 and the second structure 122 relative to one another causing the deaerated adhesive to be disposed in the bond cavity 130 between the first structure 120 and the second structure 122.

FIG. 14 illustrates a flowchart of additional functions for use with the method 200 shown in FIG. 8, according to an example implementation. In particular, FIG. 14 illustrates block 222, which includes an example function for inserting a spacer 162 into a bottom area of the bond cavity 130 to control bondline thickness.

FIG. 15 illustrates a flowchart of additional functions for use with the method 200 shown in FIG. 8, according to an example implementation. In particular, FIG. 15 illustrates block 224, which includes an example function for inserting a collapsible standoff 164 into a bottom area of the bond cavity 130 to control a distance of distribution of the adhesive 132 into the bond cavity 130 based on temperature, and the collapsible standoff 164 collapses at a predetermined temperature.

FIG. 16 illustrates a flowchart of additional functions for use with the method 200 shown in FIG. 8, according to an example implementation. In particular, FIG. 16 illustrates block 226, which includes an example function for placing the semi-permeable breather material 138 at the one or more exits 137 of the bond cavity 130.

FIG. 17 illustrates a flowchart of additional functions for use with the method 200 shown in FIG. 8, according to an example implementation. In particular, FIG. 17 illustrates block 228, which includes an example function for continuously evacuating the bond cavity 130 via the vacuum port 144 while moving the first structure 120 and the second structure 122 relative to one another.

FIG. 18 illustrates a flowchart of additional functions for use with the method 200 shown in FIG. 8, according to an example implementation. In particular, FIG. 18 illustrates block 230, which includes an example function for controlling a position of the first structure 120 relative to the second structure 122 via a collapsible standoff 156/158/164, and the collapsible standoff 156/158/164 collapses at a predetermined temperature due to thermal softening of the collapsible standoff 156/158/164.

FIG. 19 illustrates a flowchart of additional functions for use with the method 200 shown in FIG. 8, according to an example implementation. In particular, FIG. 19 illustrates block 232, which includes an example function for controlling a thickness of a bondline between the first structure 120 and the second structure 122 via a residual thickness of a collapsed collapsible standoff 156/158/164.

FIG. 20 illustrates a flowchart of additional functions for use with the method 200 shown in FIG. 8, according to an example implementation. In particular, FIG. 20 illustrates blocks 234, 236, and 238. At block 234, an example function includes placing a collapsible standoff 156 in a hole 161 of a surface of the second structure 122, and the surface of the second structure 122 is configured to move toward the first structure 120. At block 236, an example function includes placing the adhesive 132 in the hole 161 of the surface of the second structure 122. At block 238, an example function includes forcing the first structure 120 against the collapsible standoff 156 to contact the collapsible standoff 156 and force the adhesive 132 to flow between the first structure 120 and the second structure 122.

FIG. 21 illustrates a flowchart of additional functions for use with the method 200 shown in FIG. 8, according to an example implementation. In particular, FIG. 21 illustrates blocks 240 and 242. At block 240, an example function includes while curing the deaerated adhesive disposed between the first structure 120 and the second structure 122 to bond the first structure 120 to the second structure 122, causing the collapsible standoff 156 to collapse due to heating and thermal softening at a predetermined temperature, and at block 242 an example function includes continuously evacuating the bond cavity via the vacuum port 144 drawing the first structure 120 and the second structure 122 toward each other.

FIG. 22 illustrates a flowchart of additional functions for use with the method 200 shown in FIG. 8, according to an example implementation. In particular, FIG. 22 illustrates blocks 244, 246, and 248. At block 244, an example function includes placing a collapsible standoff 156/158 between the first structure 120 and the second structure 122 to control a position of the first structure 120 relative to the second structure 122, and the collapsible standoff 156/158 collapses at a predetermined temperature due to thermal softening. At block 246, an example function includes applying heat to achieve a first temperature to cause the collapsible standoff 156/158 to collapse resulting in the first structure 120 and the second structure 122 moving toward each other due to vacuum pressure. At block 248, an example function includes applying heat to achieve a second temperature higher than the first temperature to cure the deaerated adhesive and bond the first structure 120 to the second structure 122.

Using example methods and systems described herein can enable creation of bonded structures that have improved strength and higher quality. For instance, the example methods and systems described herein can enable creation of voidfree bondlines in pi joints and single shear joints in aircraft. This results from adhesive being de-aerated within the bond cavity so that no or reduced voids are included in the resulting bondline.

By the term "substantially," "similarity," and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method of joining a first structure and a second structure, the method comprising:
   placing an adhesive within a bond cavity for bonding a first structure to a second structure;
   securing a vacuum bag to the first structure and the second structure so as to surround a portion of the first structure and the second structure;
   evacuating the bond cavity via a vacuum port to deaerate the adhesive within the bond cavity;
   after deaerating the adhesive, moving the first structure and the second structure relative to one another such that deaerated adhesive is disposed between the first structure and the second structure;
   controlling a position of the first structure relative to the second structure via a collapsible standoff, wherein the collapsible standoff collapses at a predetermined temperature due to thermal softening of the collapsible standoff; and
   curing, via one or more heaters, the deaerated adhesive disposed between the first structure and the second structure to bond the first structure to the second structure.

2. The method of claim 1, wherein placing an adhesive within the bond cavity for bonding the first structure to the second structure comprises pre-placing the adhesive on each bonding surface of the first structure and the second structure.

3. The method of claim 2, wherein moving the first structure and the second structure relative to one another comprises moving the first structure and the second structure so that each bonding surface of the first structure and the second structure move toward each other.

4. The method of claim 1, further comprising:
   forming the bond cavity between a first structure and a second structure via positioning of the first structure relative to the second structure.

5. The method of claim 4, wherein moving the first structure and the second structure relative to one another causes the deaerated adhesive to be disposed in the bond cavity between the first structure and the second structure.

6. The method of claim 4, further comprising:
inserting a spacer into a bottom area of the bond cavity to control bondline thickness.

7. The method of claim 4, further comprising:
inserting the collapsible standoff into a bottom area of the bond cavity to control a distance of distribution of the adhesive into the bond cavity based on temperature.

8. The method of claim 4, further comprising:
placing a semi-permeable breather material at the one or more exits of the bond cavity.

9. The method of claim 1, further comprising:
continuously evacuating the bond cavity via the vacuum port while moving the first structure and the second structure relative to one another.

10. The method of claim 1, further comprising:
controlling a thickness of a bondline between the first structure and the second structure via a residual thickness of a collapsed collapsible standoff.

11. The method of claim 1, further comprising:
placing the collapsible standoff in a hole of a surface of the second structure, wherein the surface of the second structure is configured to move toward the first structure,
wherein placing the adhesive within the bond cavity comprises placing the adhesive in the hole of the surface of the second structure, and
wherein moving the first structure and the second structure relative to one another comprises forcing the first structure against the collapsible standoff to contact the collapsible standoff and force the adhesive to flow between the first structure and the second structure.

12. The method of claim 11, wherein while curing the deaerated adhesive disposed between the first structure and the second structure to bond the first structure to the second structure, the method further comprises:
causing the collapsible standoff to collapse due to heating and thermal softening at the predetermined temperature; and
continuously evacuating the bond cavity via the vacuum port drawing the first structure and the second structure toward each other.

13. The method of claim 1, further comprising:
placing the collapsible standoff between the first structure and the second structure to control a position of the first structure relative to the second structure, and the method further comprises:
applying heat to achieve a first temperature to cause the collapsible standoff to collapse resulting in the first structure and the second structure moving toward each other due to vacuum pressure; and
applying heat to achieve a second temperature higher than the first temperature to cure the deaerated adhesive and bond the first structure to the second structure.

14. The method of claim 1, wherein placing the adhesive within the bond cavity for bonding the first structure to the second structure comprises placing the adhesive within the bond cavity for bonding a component of a wing of an aircraft and a wing skin of the wing of the aircraft.

15. A method of joining a first structure and a second structure, the method comprising:
placing an adhesive within a bond cavity for bonding a first structure to a second structure;
inserting a collapsible standoff into a bottom area of the bond cavity to control a distance of distribution of the adhesive into the bond cavity based on temperature, wherein the collapsible standoff collapses at a predetermined temperature;
securing a vacuum bag to the first structure and the second structure so as to surround a portion of the first structure and the second structure;
evacuating the bond cavity via a vacuum port to deaerate the adhesive within the bond cavity;
after deaerating the adhesive, moving the first structure and the second structure relative to one another such that deaerated adhesive is disposed between the first structure and the second structure; and
curing, via one or more heaters, the deaerated adhesive disposed between the first structure and the second structure to bond the first structure to the second structure.

16. The method of claim 15, wherein placing an adhesive within the bond cavity for bonding the first structure to the second structure comprises pre-placing the adhesive on each bonding surface of the first structure and the second structure.

17. The method of claim 15, wherein placing the adhesive within the bond cavity for bonding the first structure to the second structure comprises placing the adhesive within the bond cavity for bonding a component of a wing of an aircraft and a wing skin of the wing of the aircraft.

18. A method of joining a first structure and a second structure, the method comprising:
placing an adhesive within a bond cavity for bonding a first structure to a second structure;
placing a collapsible standoff in a hole of a surface of the second structure, wherein the surface of the second structure is configured to move toward the first structure, wherein the adhesive is placed in the hole of the surface of the second structure;
securing a vacuum bag to the first structure and the second structure so as to surround a portion of the first structure and the second structure;
evacuating the bond cavity via a vacuum port to deaerate the adhesive within the bond cavity;
after deaerating the adhesive, moving the first structure and the second structure relative to one another such that deaerated adhesive is disposed between the first structure and the second structure and the first structure is forced against the collapsible standoff to contact the collapsible standoff and force the adhesive to flow between the first structure and the second structure; and
curing, via one or more heaters, the deaerated adhesive disposed between the first structure and the second structure to bond the first structure to the second structure.

19. The method of claim 18, wherein while curing the deaerated adhesive disposed between the first structure and the second structure to bond the first structure to the second structure, the method further comprises:
causing the collapsible standoff to collapse due to heating and thermal softening at the predetermined temperature; and
continuously evacuating the bond cavity via the vacuum port drawing the first structure and the second structure toward each other.

20. The method of claim 18, wherein placing the adhesive within the bond cavity for bonding the first structure to the second structure comprises placing the adhesive within the bond cavity for bonding a component of a wing of an aircraft and a wing skin of the wing of the aircraft.

\* \* \* \* \*